United States Patent [19]
Odell et al.

[11] Patent Number: 5,305,969
[45] Date of Patent: Apr. 26, 1994

[54] AIRCRAFT DOOR LATCH LOCK MECHANISM

[75] Inventors: Richard B. Odell, Kirkland; Leo W. Plude, Woodinville, both of Wash.

[73] Assignee: The Boeing Company, Seattle, Wash.

[21] Appl. No.: 746,767

[22] Filed: Jul. 16, 1991

[51] Int. Cl.$^5$ ............................................... B64C 1/14
[52] U.S. Cl. ............................ 244/129.5; 292/259 R; 292/215; 49/395
[58] Field of Search ......................... 244/129.5, 118.5; 49/395, 278; 292/218, 259, 215

[56] References Cited

U.S. PATENT DOCUMENTS

| | | | |
|---|---|---|---|
| 2,751,636 | 6/1956 | Heinemann et al. | 49/249 |
| 3,004,303 | 10/1961 | Wilmer | 244/129.5 |
| 3,051,280 | 8/1962 | Bergman et al. | 244/129.5 |
| 3,791,073 | 2/1974 | Baker | 244/129.5 |
| 4,125,235 | 11/1978 | Fitzgerald et al. | 244/137 |
| 4,720,065 | 1/1988 | Hamatani | 244/129.5 |
| 4,944,473 | 7/1990 | Kallies et al. | 244/129.5 |

FOREIGN PATENT DOCUMENTS 1244016  7/1967  Fed. Rep. of Germany ........ 49/350

*Primary Examiner*—Joseph F. Peters, Jr.
*Assistant Examiner*—Anne E. Bidwell
*Attorney, Agent, or Firm*—Christensen, O'Connor, Johnson & Kindness

[57] ABSTRACT

A latch lock mechanism (20) for opening and closing a translating motion-type aircraft door (22). The latch lock mechanism (20) of this invention includes a latch shaft (38) that is mounted to the door (22) by a set of follower bearings (98) that are axially offset from the shaft. The shaft (38) is rotated by a lift lock mechanism (44) that includes a lift lock cam (106) and a cam follower (108) that tracks the cam, and a door drive linkage (1 10) that is attached to the cam follower for rotating the latch shaft. The lift lock cam (106) is rotated by a handle shaft (42) that is actuated by a handle (40). When the handle (40) is rotated, the lift lock cam (106) is similarly rotated so as to cause the upward movement of the door drive linkage (110) in the rotation of the latch shaft (38). The follower bearings (98) rotate about the latch shaft (38) so as to lift the latch shaft and the door (22) upwards so as to allow the door to clear fixed fuselage stop tabs (32) so that the door can be moved to an open position. An auxiliary latch-hold up cam mechanism (46) forces the door (22) open in the event the latch shaft (38) and associated components fail. A pressure vent door (34) is selectively opened by an associated opener assembly (48) connected to the handle shaft (42). In the event an attempt is made to open the door while the aircraft is in flight, the pressure vent door opener assembly (48) locks out so as to inhibit movement of the handle shaft (42) that would actuate the latch shaft (38) and open the door (22).

40 Claims, 11 Drawing Sheets

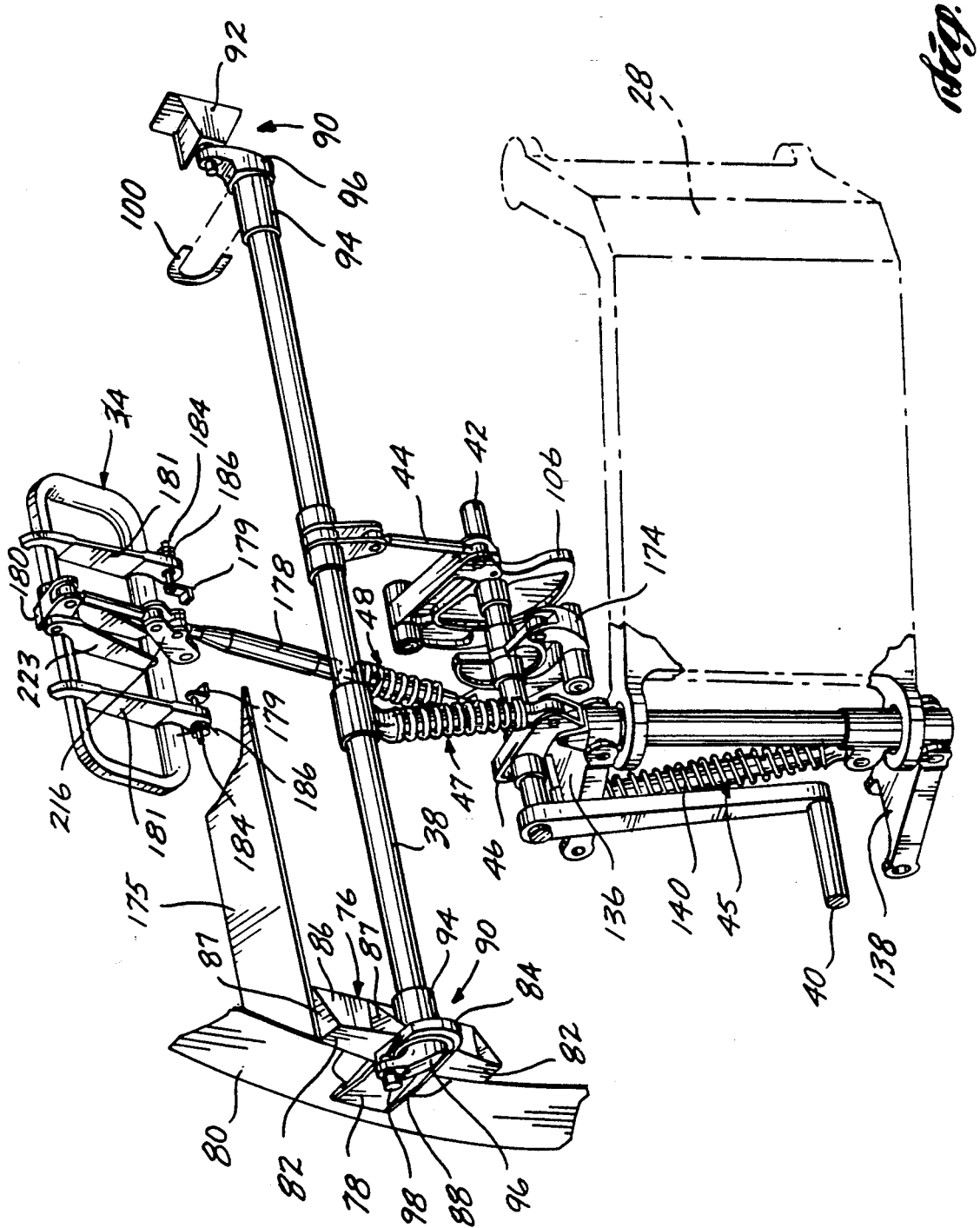

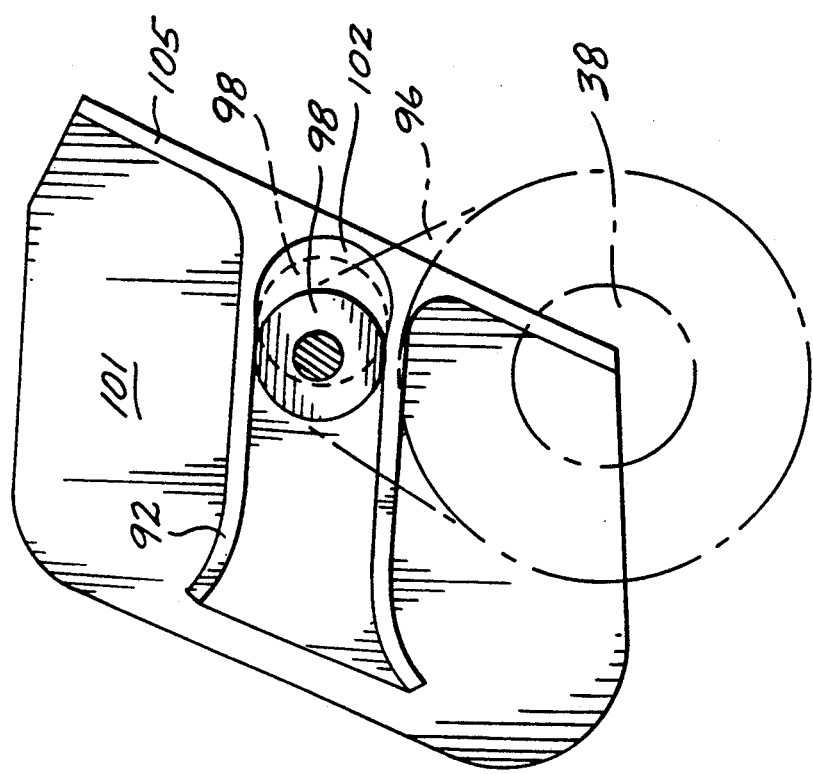
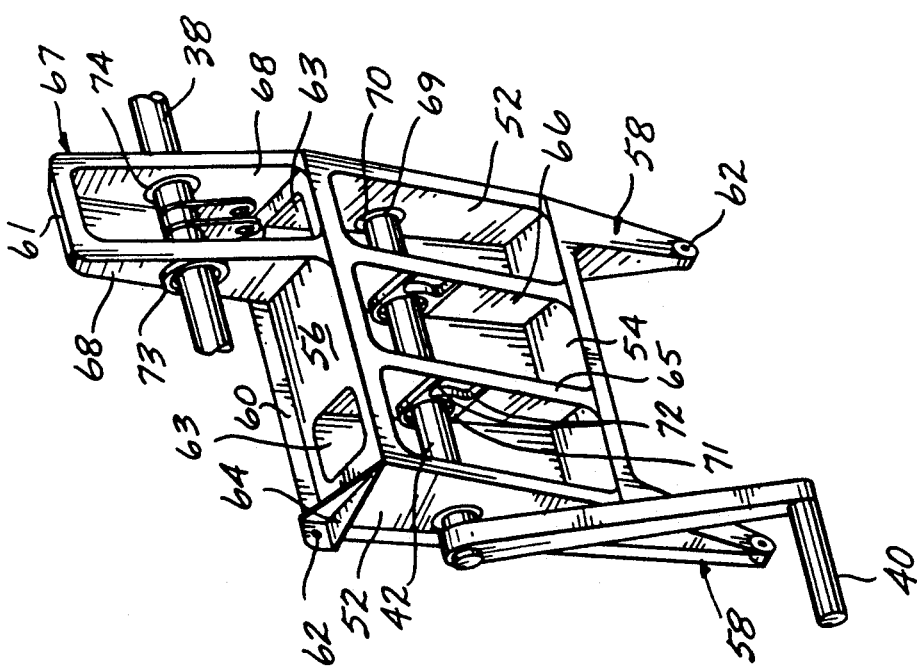

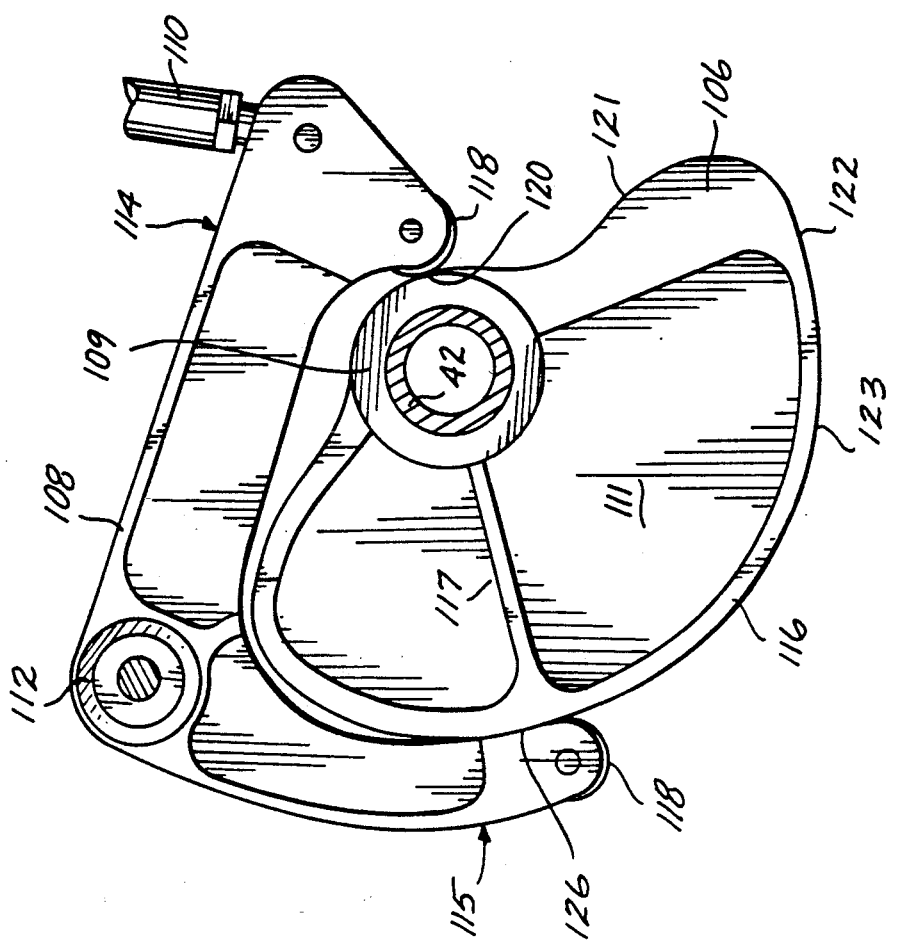
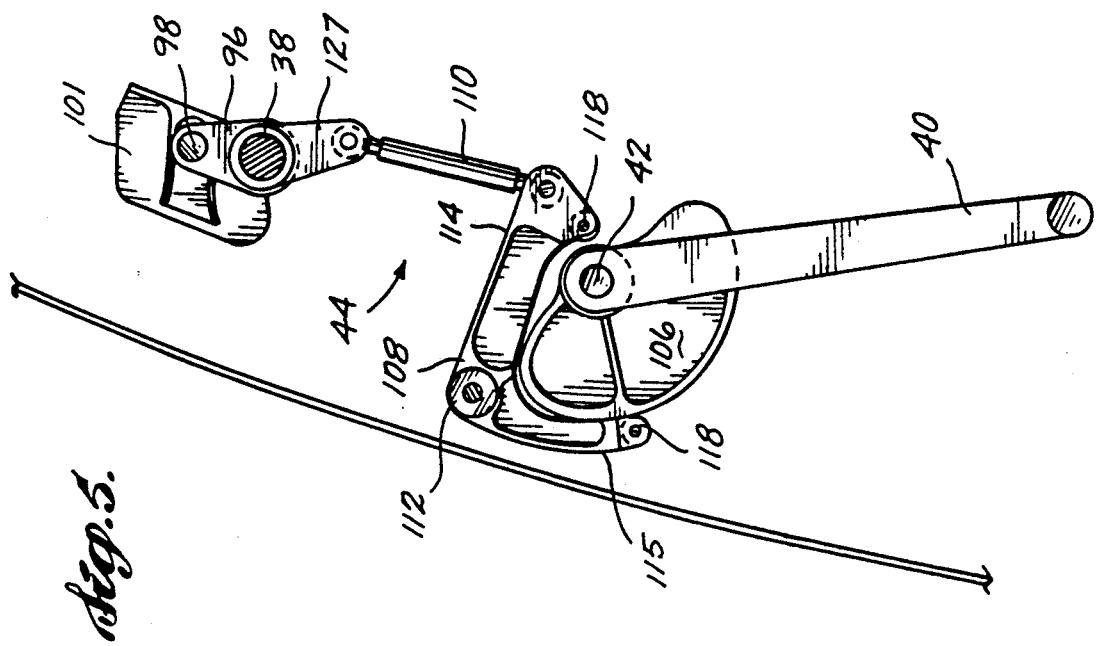

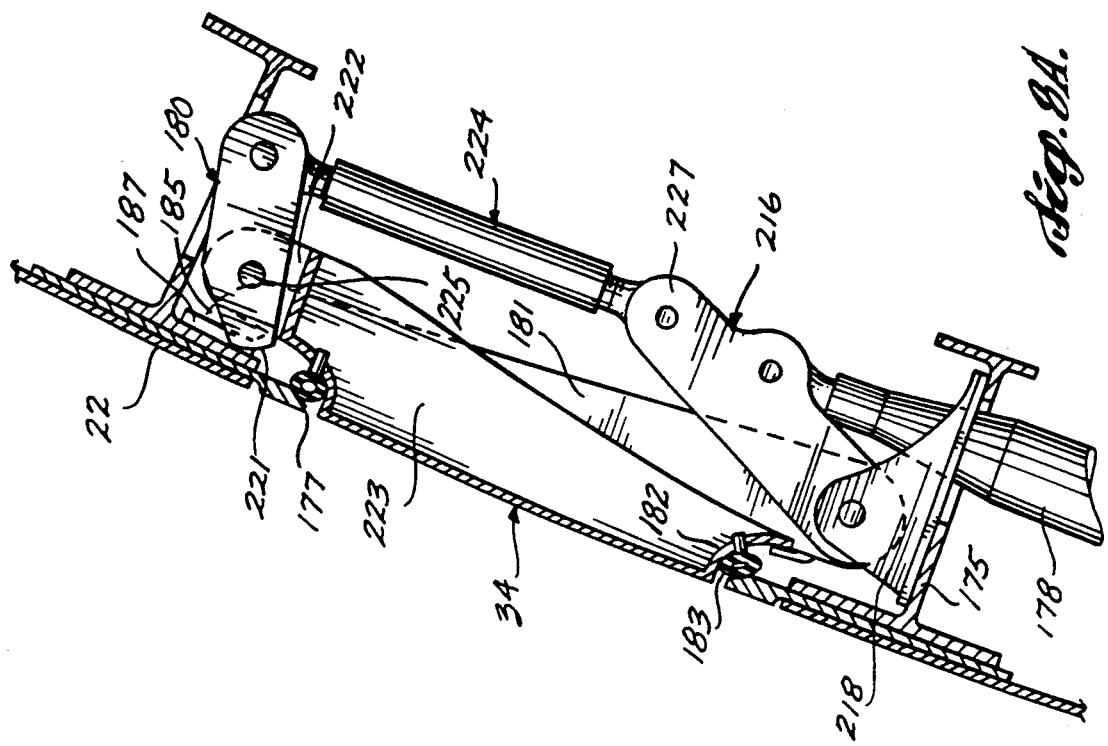
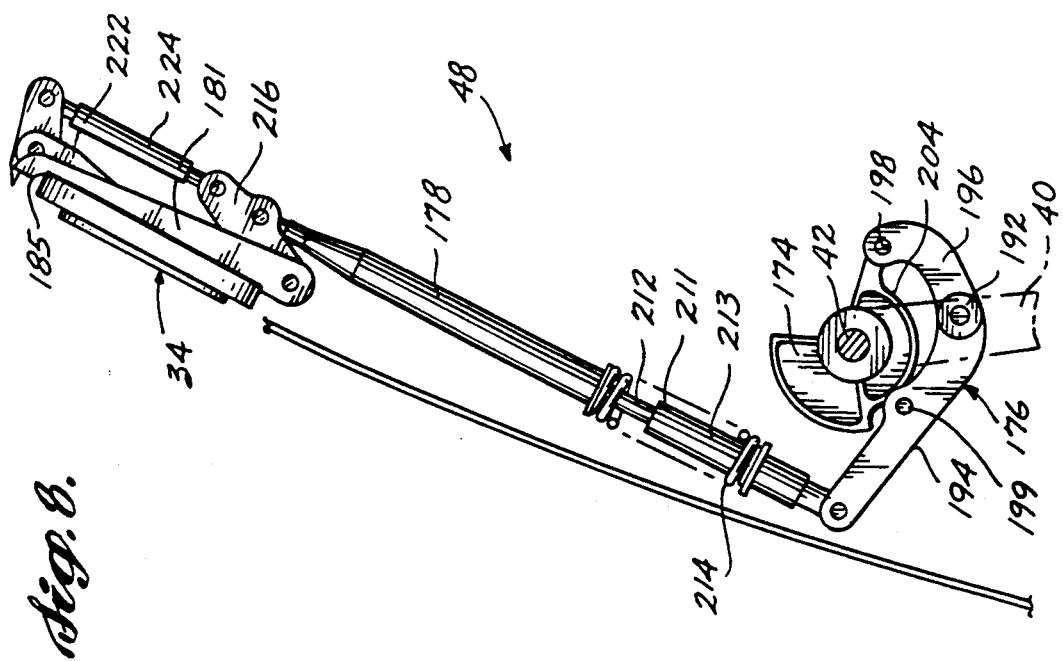

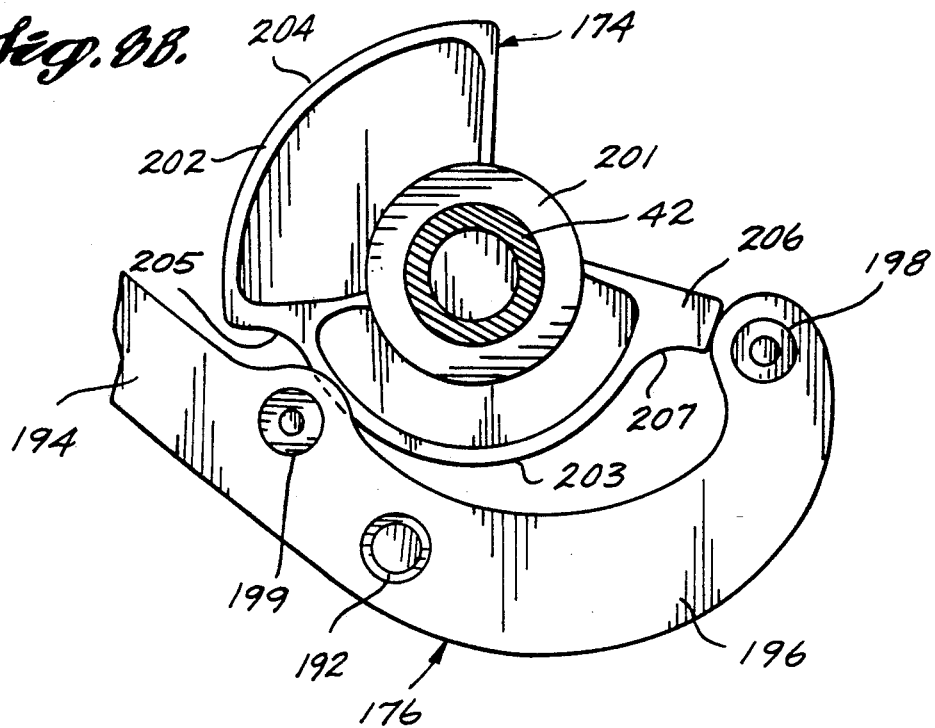
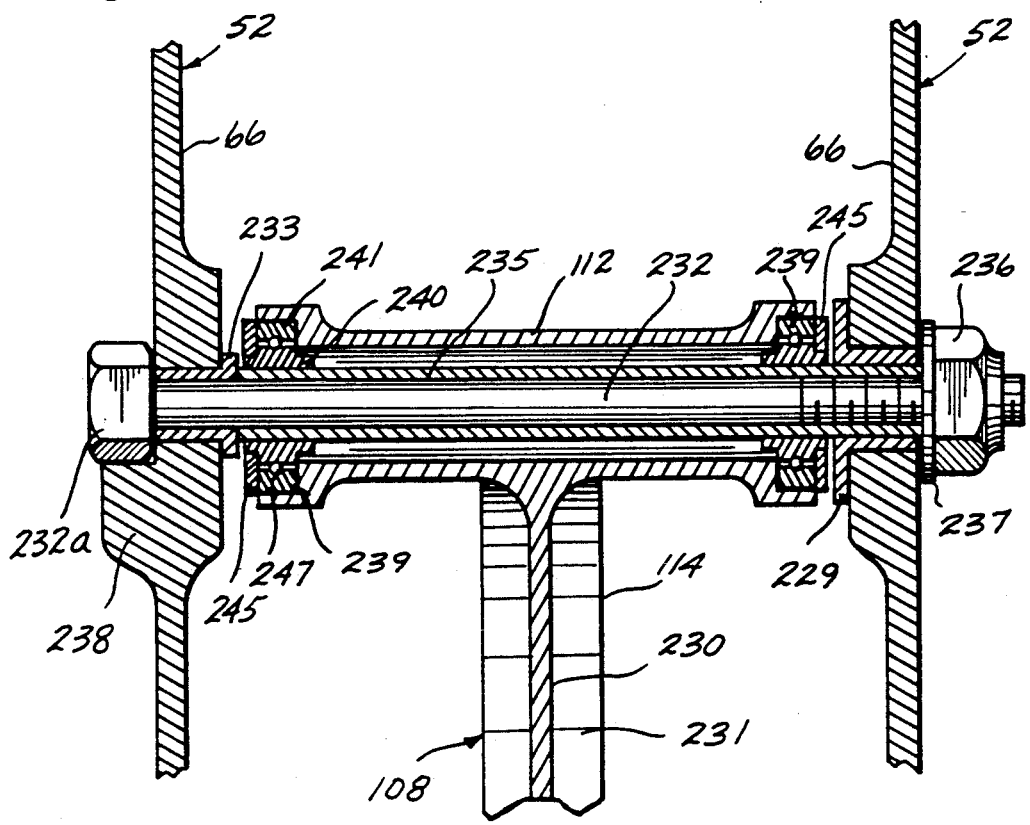

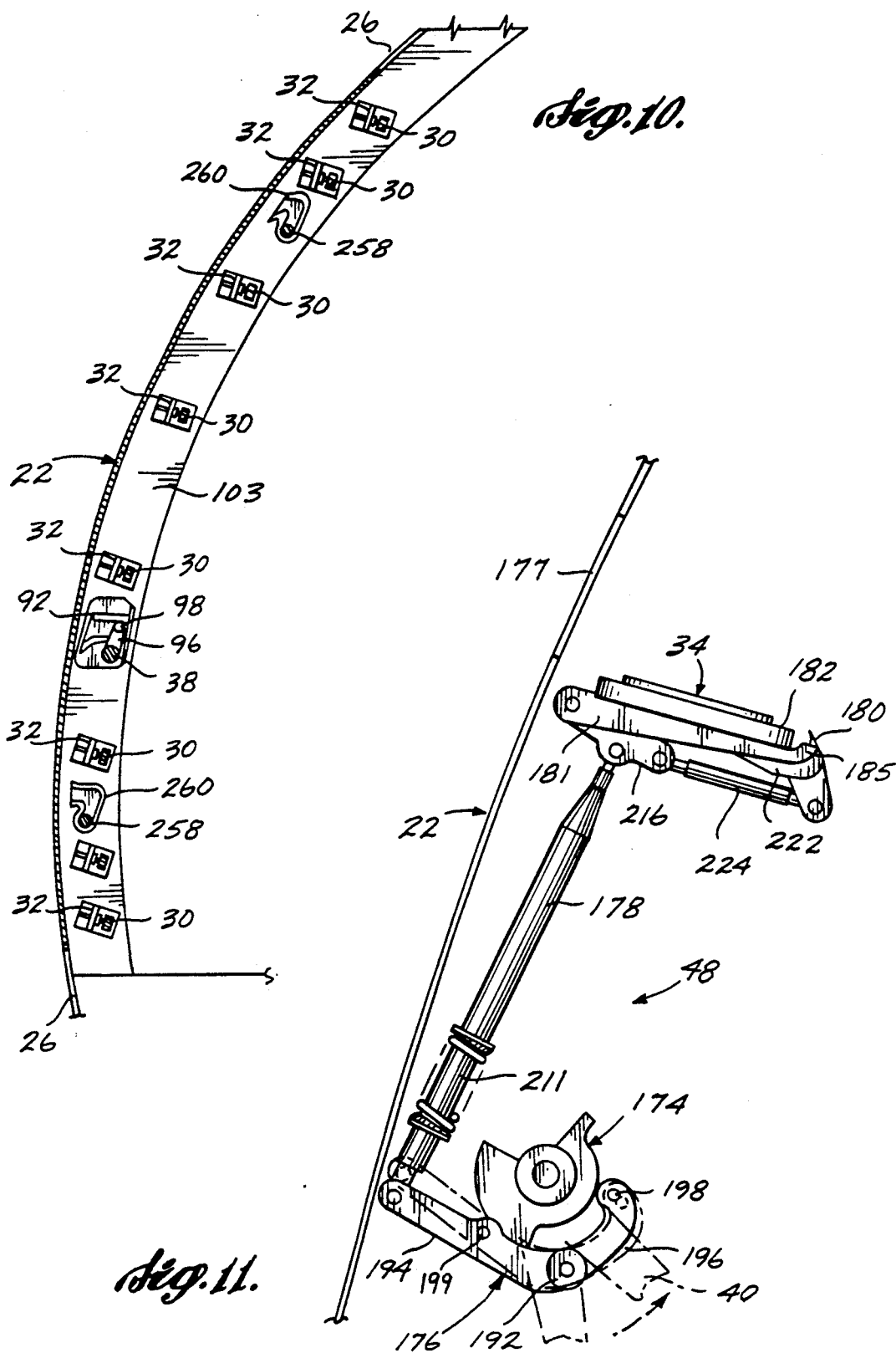

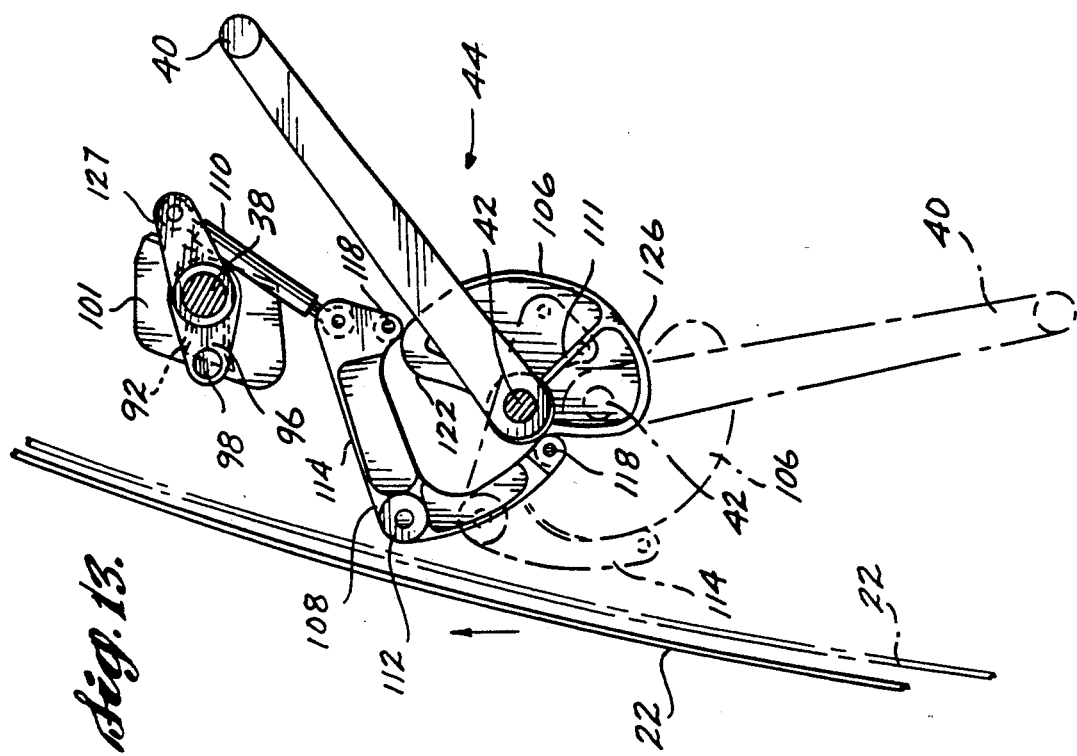
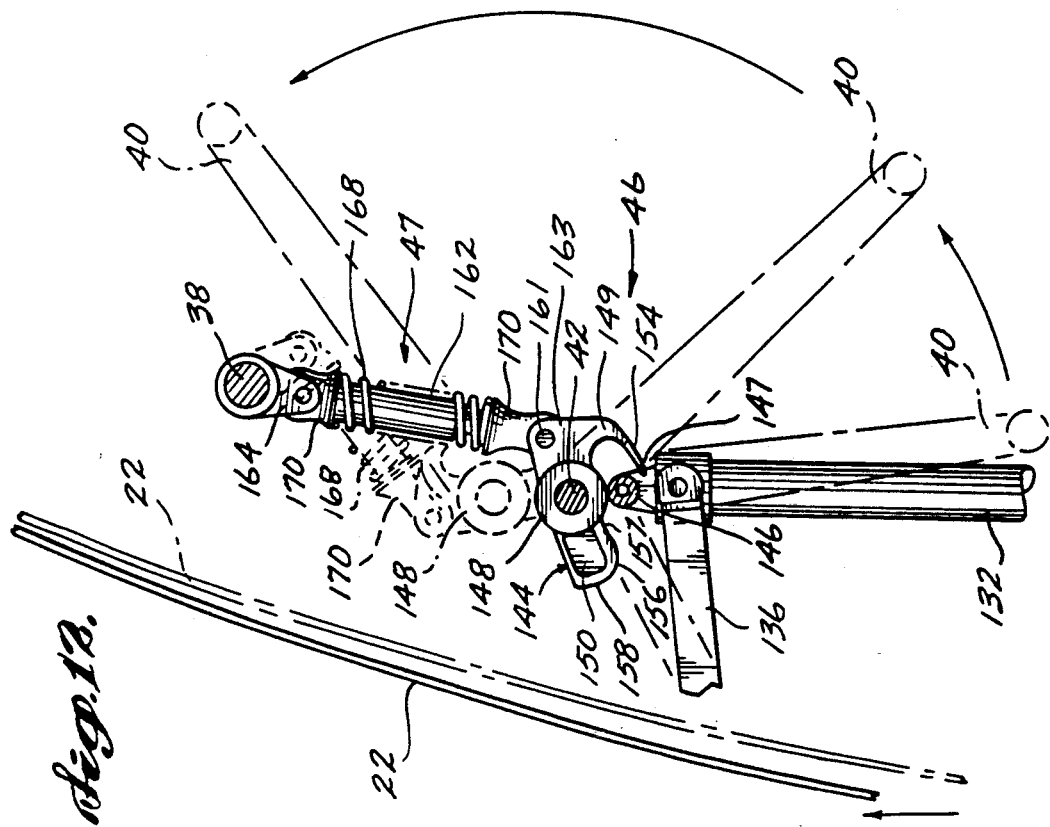

AIRCRAFT DOOR LATCH LOCK MECHANISM

FIELD OF THE INVENTION

This invention relates to aircraft door assemblies and, more particularly, to a latch lock mechanism for opening, latching and locking a translating motion-type aircraft door.

BACKGROUND OF THE INVENTION

An integral part of an aircraft fuselage is the door assembly through which passengers and crew enter and exit the aircraft. One type of aircraft door that has become increasingly popular for use with commercial aircraft is the translating motion door. A translating motion door, when opened, first moves upwards and slightly away from the opening in which it was seated. The door is then moved outwards, away from the opening so as to allow passage through the opening.

Translating motion doors have taken the place of aircraft cocking doors. A cocking door is rotated inwards and then moves diagonally outwards of the fuselage opening with which it is associated. A translating door does not swing into the space adjacent the egress way inside the aircraft to the same extent that a comparable cocking door swings into this space when it is opened. When a cocking door is installed on an aircraft, this space must be kept clear to insure that the door can freely open. In comparison, when a translating door is installed there is no need to keep this space clear; interior units such as galleys, lavatories and even seats can be placed in the aircraft much closer to the egress way. Thus, the installation of a translating door onto an aircraft makes it possible to enhance the utilization of the space inside the aircraft. A translating door is also smaller in size and lighter in weight than a cocking door used to seal the same sized opening. Moreover, a translating motion door is typically assembled out of fewer components that are less expensive to manufacture than that of a comparable cocking door. Another advantage of a translating door is that it moves along a relatively horizontal path when opened. In comparison to the upwards movement of a cocking door, this feature makes the translating door much easier to open. This feature is important because cabin attendants, who are often small in stature, sometimes find it physically strenuous to open a cocking door.

Aircraft doors, including translating doors, are held in place by stop pins which extend outwards from the door that abut complementary stop pads extending from the fuselage in the door opening. When an aircraft is in pressurized flight, the interior fuselage pressure serves to urge the door outwards; the stop pins are held in place against the stop pads so as to hold the door in place. The opening and closing of a translating motion aircraft door is controlled by a latch lock mechanism. The latch lock mechanism opens the door by initially raising the door so that stops on the door clear complementary stops that extend into the fuselage opening. Once the stops are cleared, the latch lock mechanism moves the door away from the fuselage so that it can be moved free of the opening. The movement of the door away from the opening clears the opening so as to allow persons to enter and exit the aircraft. The latch lock mechanism is used to close the door by reversing the motion used to open the door. The latch lock mechanism also prevents the door from opening once it is closed. In order to be suitable for use in a commercial aircraft, a latch lock mechanism must be configured so that a cabin attendant with relatively low body strength can actuate the mechanism so as to lift open a door that may weigh 350 pounds or more.

A disadvantage of many aircraft door latch lock mechanisms for translating motion doors is that the movement of the mechanism is controlled by a handle that pivots about an axis that extends laterally across the aircraft. The difficulty with these mechanisms is that at some point during the opening of the door it is necessary to move the handle downwards, while the latch mechanism is working to move the door upwards. In other words, the person who is trying to open the door by moving it upwards finds it necessary to exert a downwards force on the door. This mechanical inconsistency increases the overall physical strength required to open the door.

SUMMARY OF THE INVENTION

This invention relates generally to a latch lock mechanism for opening and controlling a translating motion-type aircraft door. The latch lock mechanism of this invention includes a latch shaft for lifting the door upwards so that the door stop pins clear the associated fuselage stop pads. The movement of the latch shaft is controlled by a handle that is pivoted upwards in order to cause the desired door up and out movement. The handle is attached to a rotating handle shaft that is approximately parallel to the latch shaft. A lift-lock cam is attached to the cam. A set of cam followers are controlled by the lift-latch cam. The cam followers control the actuation of a drive link that in turn controls the movement of the latch shaft. When a door to which this invention is installed is closed and latched, the lift-lock cam prevents the cam followers and drive link from moving so that the latch shaft is similarly prevented from moving. Since the latch shaft cannot move, the door is prevented from opening. When the door is opened, the handle is rotated so as to cause simultaneous rotation of the lift-lock cam. The movement of the lift lock cam actuates the cam followers and the drive link so as to rotate the latch shaft into the open position. This causes the door to move upwards so that door stop pins clear the fuselage stop pads so that door can be moved away from the opening in which it is seated.

An advantage of the latch lock mechanism of this invention is that the force employed to move the door upwards is the upwards force of the person actuating the handle. Energy is not lost through the latching mechanism by the act of opening the door. As a result, the amount of force required to open the door with which this latching mechanism is employed is reduced.

The latch lock mechanism of this invention also is provided with a lock spring assembly that extends between the latch shaft and the handle shaft. When the door is closed, the lock spring assembly imposes a force on the latch shaft to prevent the shaft from rotating into the door open position. When the door is opened, the lock spring assembly provides a force to urge the latch shaft into the open position so as to minimize the human-provided force necessary to actuate the shaft.

The latch lock mechanism further includes an auxiliary latch-hold up cam assembly. When the door is closed, this assembly prevents the unintentional movement of the latch shaft even if the other components of the mechanism fail. When it is time to open the door, this assembly can be used to open the door in the event the latch shaft fails. Furthermore, if the latch shaft fails, the auxiliary latchhold up cam will prevent the door from closing. This serves to provide notice of the failure.

Still another advantage of the latch lock mechanism of this invention is that the components can all be readily disassembled from the door with which the assembly is employed. Thus, in the event the mechanism requires extensive maintenance or repair, it can readily be removed from the associated aircraft. This eliminates the need to take the aircraft out of service solely to perform extensive work on the latch mechanism.

BRIEF DESCRIPTION OF THE DRAWINGS

This invention is pointed out with particularity in the appended claims. The above and further advantages of the invention may be better understood by referring to the following description taken in conjunction with the accompanying drawings, in which:

FIG. 2 is a perspective view illustrating the latch lock mechanism of FIG. 1 wherein only selected selections of the associated aircraft door are partially shown;

FIG. 3 illustrates the handle box of the latch lock mechanism of this invention;

FIG. 4 is a side view illustrating a cam track and the associated cam follower bearing of this latch lock mechanism;

FIG. 5 is a side view illustrating a lift-lock mechanism of the latch lock mechanism wherein the lift lock mechanism is in the closed state;

FIG. 5a is a detailed side view of the lift-lock cam and cam follower of FIG. 5;

FIG. 8 is a side view of a pressure vent door opener assembly of the latch lock mechanism of this invention when the latch lock mechanism is in the closed state;

FIG. 8a is a detailed side view of the ice breaker assembly of the pressure vent door assembly of FIG. 8;

FIG. 8b is a detailed side view of the pressure vent door opener cam and cam follower of FIG. 8;

FIG. 9 is a cross-sectional view illustrating how a lift lock cam follower is secured to the handle box according to this invention;

FIG. 10 is a side view illustrating a fuselage frame member adjacent the door opening, and further illustrating the stop pads and cam guide tracks on the fuselage frame member and the stop pins and guide roller bearings on the aircraft door when the door is in the closed state;

FIG. 11 is a side view of the pressure vent door opener assembly of FIG. 8 wherein the latch lock mechanism is in the open state;

FIG. 12 is a side view of the auxiliary latch hold-up cam mechanism and lock spring assembly of FIG. 7 when the latch lock mechanism of this invention is in the open state;

FIG. 13 is a side view of the lift lock mechanism of FIG. 5 when the latch lock mechanism of this invention is in the open state.

DETAILED DESCRIPTION OF THE PREFERRED EMBODIMENT

Figure 1:
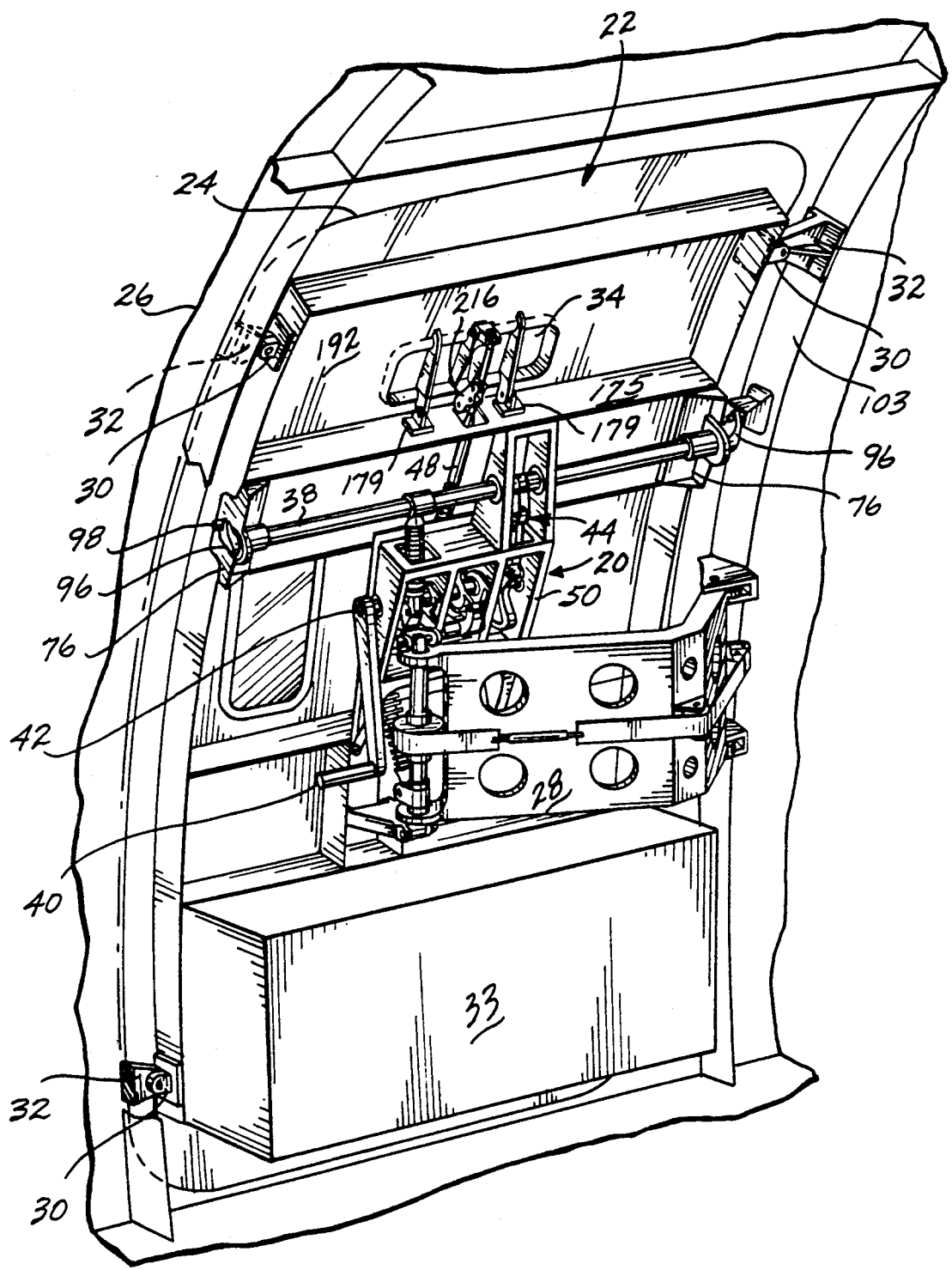
FIG. 1 is a perspective view of an airplane door that illustrates a latch lock mechanism of this invention.

FIG. 1 depicts a latch lock mechanism 20 of this invention installed in an aircraft door 22. The aircraft door 22 is seated in opening 24 formed in the aircraft fuselage 26. A hinge 28 connects the aircraft door 22 to the fuselage 26 and allows the door to move outwards away from the fuselage opening 24. The aircraft door 22 is provided with outwardly extending adjustable door stop pins 30. The fuselage 26 is provided with fuselage stop pads 32 that complement the stop pins 30. When the door 22 is properly seated in the opening 24, the stop pins 30 are aligned with the stop pads 32. When the aircraft is in pressurized flight, the pressure inside the fuselage 26 urges the door 22 outwards; the stop pins 30 abut the stop pads 32 so as to secure the door in place. A bustle 33 attached to the lower portion of the door 22 contains an inflatable escape slide, not shown, that can be deployed to facilitate rapid evacuation of the aircraft. A small pressure vent door 34 is mounted in the top of the aircraft door 22. In the event the aircraft rapidly descends, the pressure vent door 34 will momentarily open so that the interior fuselage pressure can equalize with the outside air pressure. The pressure vent door 34 is also arranged to close after the aircraft door 22 is closed, this prevents the inadvertent pressurization of the aircraft when the fuselage 26 is not properly sealed.

As illustrated in FIG. 2, the latch lock mechanism 20 includes a latch shaft 38 that controls the raising and lowering of the door 22 around the stop pads 32 so as to facilitate the opening and closing of the door. The actuation of the latch shaft 38 is controlled by a handle 40. The latch lock mechanism 20 further includes a handle shaft 42 that is connected to the handle 40 so as to rotate with the movement of the handle. The handle shaft 42 has an axis that is approximately parallel to the axis of the latch shaft 38. A lift-lock mechanism 44 connected between the handle shaft 42 and the latch shaft 38 transfers the rotational energy applied to the handle shaft to the latch shaft. The lift-lock mechanism 44 also prevents the unintentional actuation of the latch shaft 38 when the door 22 is in the closed position such as might occur from inertia. A counter balance assembly 45 is connected between the door 22 and the hinge 28 which provides force for lifting the door clear of the fuselage stop pins 30. An auxiliary latch-hold up cam mechanism 46 is connected between the handle shaft 42 and the hinge 28. When the door 22 is closed, the auxiliary latch-hold up cam mechanism 46 prevents the door from opening in the event of failure of the latch shaft 38 or the lift-lock mechanism 44. The auxiliary latch-hold up cam mechanism 46 further serves to hold the door 22 in the elevated position when the door is opened. In the event the latch shaft 38 or the lift-lock mechanism 44 fails, the auxiliary latch-hold up cam mechanism 46 will also urge the door 22 upwards so that door stop pins 30 clear the fuselage stop pads 32.

A lock spring assembly 47 is connected between the auxiliary latch-hold up cam mechanism 46 and the latch shaft 38. When the door 22 is closed, the lock spring assembly 47 provides a biasing force to prevent the latch shaft 38 from rotating into the open position. When the door 22 is being opened, the lock spring assembly 47 provides a biasing force to urge the latch shaft 38 into the open position so as to augment the lifting force provided by the counterbalance assembly 45. A pressure vent door opener assembly 48 is connected between the handle shaft 42 and the pressure vent door 34. The pressure vent door opener assembly 48 is designed to open the pressure vent door 34 prior to the actuation of the latch shaft 38. When the aircraft is in pressurized flight, fuselage interior pressure blocks the opening of the pressure vent door 34, so that the pressure vent door opener assembly 48 cannot move and further actuation of the latch lock mechanism 20 is blocked. This "lock out" prevents the inadvertent opening of the aircraft door 22. The individual components of the latch lock mechanism 20 are each wholly or partially mounted in a handle box 50 depicted in FIGS. 1 and 3. The handle box 50 is mounted to the inside structural frame members that form the aircraft door 22.

The handle box 50 is generally in the form of an open rectangular frame that is formed out of a pair of opposed side bearing walls 52, a bottom wall and a top wall 56. A pair of legs 58 extend downwards from the opposed ends of the bottom wall 54. A flange 60 extends around the perimeter and the sides of the handle box 50 adjacent the aircraft door 22. The ends of the legs 58 and the flange 60 are formed with openings 62 to receive complementary fasteners for securing the handle box 50 to the aircraft door 22. Triangular shaped reinforcing members 64 extend between the flange 60 and the side walls 52 and the flange and the top wall 56. Two intermediate bearing webs 66 extend between bottom wall 54 and top wall 56. The handle box is formed with a strengthening flange 65 that is integral with the exposed edges of the side walls 52, the bottom wall 54, the top wall 56, the legs 58 and the intermediate bearing webs 66. The strengthening flange 65 extends across and is centered over the adjacent handle box element edges with which it is integral. The latch shaft 38 is fitted to an extension frame 67 that is integral with the handle box 50 that projects upwards from the top wall 56. The frame 67 has two parallel side walls 68 that are separated by a third wall 61. The frame 67 is located so that one of the side walls 68 is coplanar with the bearing side wall 52 spaced away from the handle 40. The strengthening flange 65 extends over the outer edges of the extension frame 67.

The bearing side walls 52, in combination with the bearing intermediate webs 66, form three sections within the handle box 50. The auxiliary latch-hold up cam mechanism 46 and the lock spring assembly 47 are disposed in the section adjacent the handle 40. The pressure vent door opener assembly 48 is secured to the handle shaft 42 in middle section. The lift-lock mechanism 44 is located in the section of the handle box 50 that is spaced farthest away from the handle 40. The handle box top wall 56 is formed with two rectangular openings 63 that allow the appropriate components of e lift-lock mechanism 44 and e lock spring assembly 47 to extend through the handle box to the latch shaft 38. The opening 63 with which the lift lock mechanism 44 is associated opens into the space defined by the handle box extension frame 67.

The handle shaft 42 is seated in a set of coaxial openings 69, only one identified, that are formed in the bearing side walls 52 and bearing intermediate webs 66. Ball bearing assemblies 70, only one identified, are fitted in the openings 69 around the handle shaft 42 to provide a low friction interface between the handle shaft 42 and the handle box 50. The bearing side walls 52 and intermediate bearing webs 66 are further formed with a bearing bosses 71, only one identified, in the form of a raised ring shaped rib that extend around the openings 69 adjacent the bearing assemblies 70. A pair of raised riblets 72 extend outwards from the bearing side walls 52 and the bearing intermediate webs 66 between an opposed point on each bearing boss 71 to the strengthening flange 65. The bearing bosses 71 and riblets 72 serve to reinforce the handle box 50 around the handle shaft openings 69. The latch shaft 38 extends through two coaxial openings 73, only one identified, formed in the handle box extension frame side walls 68. Ball bearing assemblies 74, only one identified, fitted around the outer perimeter of the openings 73 allow the latch shaft 38 to freely rotate. In alternative embodiments of the invention, bushings formed of low friction plastic such as Teflon ® or Karon ® may be fitted over the shafts 38 and 42 or in the associated openings 69 and 73, respectively, so as to provide the desired low friction interface.

The latch shaft 38, illustrated in FIGS. 1 and 2, is a torsion shaft that runs the width of the aircraft door 22. The latch shaft 38 is mounted to the door 22 by a pair of pillow blocks 76, one of which is mounted to each end of the door. Each pillow block 76 is formed out of a single piece of metal and includes a mounting plate 78 adapted to be secured to the outside surface of an adjacent aircraft door edge frame member 80. A pair of spaced apart bearing plates 82 project inward from the mounting plate 78. The latch shaft 38 is fitted into a ball bearing assembly 84 which is secured to the pillow block in the space between the bearing plates 82. The ball bearing assemblies 84 secure the latch shaft 38 to the door 22 so as to allow free axial rotation of the shaft. A back plate 86 extends perpendicularly between the mounting plate 78 and the bearing plate 82 and is fitted to the inside of the aircraft door 22. A first set of reinforcing flanges 87, four shown, extend perpendicularly between the bearing plate 82 and the back plate 86. A second set of reinforcing flanges 88 extend outwards between the mounting plate 78 and the individual bearing plates 82 adjacent the opposed sides of the bearing assembly 84.

Each end of the latch shaft 38 is provided with a crank assembly 90 that couples the shaft to an adjacent lift-latch cam track 92 that is mounted to the fuselage 26 in the door opening 24. Each crank assembly includes a cylindrical fitting 94 that is coupled over a free end of the latch shaft 38. A crank arm 96 is integrally attached to the free end of the fitting 94. The crank arm 96 is shaped so as to extend outwards away from both the end of the latch shaft 38 and the axis of the latch shaft. A lift-latch cam follower bearing 98 is rotatably mounted to the free end of the crank arm 96. The head of the lift latch cam follower bearing 98 extends outwards away from the end of the latch shaft 38. In one preferred embodiment of the invention, the crank arm 96 provides approximately a 1.6 inch separation between the axis of the latch shaft 38 and the axis of the cam bearing 98. A set of horseshoe-shaped shims 100, one shown, may be disposed around the crank assembly fitting 94 adjacent the crank arm 96. The shims 100 serve to provide a secure fit between the bearing assembly 84 and the crank arm 96 by eliminating any slack space therebetween. The number of shims 100 fitted around the crank assembly fitting 94 can be selected to compensate for manufacturing differences between a given latch shaft 38 and the door 22 to which the shaft is installed. In a preferred embodiment of the invention, the individual shims 100 are approximately 16 mills (0.016 inches) thick.

The lift-latch cam track 92 is in the form of a generally U-shaped member as depicted in FIG. 4. The lift-latch cam track 92 is integrally formed with a base plate 101. The base plate 101 facilitates mounting the track 92 to a fuselage frame member 103 (FIG. 1) adjacent the door opening 24. The cam track 92 is dimensioned to receive the head of the lift-latch cam follower bearing 98 when the door 22 is closed. The free ends of the cam track 92 are outwardly flared away from each other to facilitate receiving the lift-latch cam follower bearing 98 in the event the bearing is not precisely aligned with the center of the track. The cam track 92 has a closed end 102 that is formed with a slightly fish-mouthed profile; the radius of this section is slightly larger than the pure radius required to receive the head of the lift-latch cam follower bearing 98. In FIG. 4 the cam follower bearing 98 is depicted as being directly above the axis of the latch shaft 38. In alternative preferred embodiments of the invention, the crank assembly 90 is arranged so that when door 22 is closed, the crank arm 96 is positioned so that the cam follower bearing 98 is in approximately a 5° to 10° over center position towards the inside of the aircraft relative to the axis of the latch shaft 38 and is seated immediately forward of the fish-mouthed end 102 of the cam follower track 92. This configuration insures that if the door 22 is forced upwards, the cam follower bearing 98 will strike the upper fish-mouthed section of the cam track 92 and move inwards. The lift-lock cam follower bearing 98 will pull the rest of the latch mechanism 20 in the same inward direction so as to insure that the door 22 will remain shut. In the illustrated embodiment of the invention the cam track is integral formed with a reinforcing flange 105 that extends outwards from the inboard edge of the base plate 101.

The lift-lock mechanism 44, depicted in detail in FIGS. 5 and 5a, selectively rotates the latch shaft 38 so as to control the opening, closing and locking of the door 22. The lift-lock mechanism 44 includes a lift-lock cam 106 that is attached to the handle shaft 42 for rotation therewith. A lift-lock cam follower 108 is pivotally mounted to the handle box 50 to track the movement of the lift-lock cam 106. A drive link 110 is connected between the lift-lock cam follower 108 and the latch shaft 38 to rotate the shaft in response to the movement of the cam follower.

The lift-lock cam follower 108 includes a trunion 112 that is rotatably attached to the handle box 50 between the side bearing wall 52 spaced from the handle 40 and the adjacent bearing intermediate web 66 (FIG. 3). A first, lifting arm 114 extends outwards from the cam follower trunion 112. A second, locking arm 115 extends downwards from the trunion 112, such that arms 114 and 115 are approximately perpendicular to each other. The locking arm 115 has a slightly bowed shape so as to conform with the outward curvature of the lift-lock cam 106. Cam follower bearings 118 are rotatably attached to the free ends of the cam follower arms 114 and 115. The cam follower bearings 118 are arranged to abut the adjacent surfaces of the lift-lock cam 106. The lift-lock cam 106 is an integral unit that includes a tubular base section 109 mounted to the handle shaft 42 so as to rotate in unison therewith. A web 111 that approximates a 150° slice of a circle is mounted to the base section 109. A flange 116 is located over the outer edge of the web 111 and forms the cam surface over which the cam follower bearings 118 travel. A reinforcing flange 117 extends between the base section 109 and the flange 116 across the web 111. The lift-lock cam 106 is shaped so that the flange 116 forms a dwell surface 120 adjacent the base section 109. In the illustrated embodiment of the invention, the dwell surface 120 is a constant radius surface that is concentric with the base section 109; when the handle shaft 42 is initially rotated as part of the process of opening the door 22, the cam follower lifting arm 114 is not urged upwards as it passes over surface 120.

The cam flange 116 is further shaped to form a lifting surface 121 adjacent the dwell surface 120. In the illustrated embodiment of the invention the portion of the lifting surface 121 immediately adjacent the dwell surface has an inwardly bowed profile. This inward profile presents a tangential surface to the lifting arm cam follower bearing 118; this serves to maximize the lifting power that is applied during the initial lifting rotation of the handle shaft. In the event the door 22 is caked with ice or otherwise prevented from opening, the maximization of the lifting force during this part of the opening process serves to overcome the restrictive forces that may block movement of the door. Between the inwardly bowed section of the lifting surface 121 and the outer diameter of the web 111, the flange 117 is shaped so that the lifting surface 121 has an outwardly curved profile.

The lift-lock cam 106 is further shaped so the Range 117 forms a small hold open surface 122 adjacent the end of the lifting surface 121. The hold open surface 122 is a small, constant radius surface. When the lifting arm cam follower bearing 118 travels over the hold open surface 122 the lifting arm is not vertically displaced. The cam is also formed with a relief surface 123 adjacent the hold open surface 122. The relief surface 123 is formed by shaping the cam 106 so that the flange 117 has a decreasing radius relative to the base section 109 away from the hold open surface 122. As the handle shaft 42 is rotated so that the lifting arm follower bearing 118 passes over the hold open surface 122, the auxiliary latch-hold up cam mechanism 46 (FIG. 7) starts to hold up the door 22 and prevent the lifting arm 114 from lowering. Since the relief surface 123 has a smaller radius than the hold open surface 122, the flange 117 spaces away from the cam follower bearing 118 so that the follower bearing and the cam 106 no longer are in contact.

The outwardly curved portion of cam flange 117 at the opposite end of the lift-lock cam 106 functions a locking surface 126. The locking arm cam follower arm abuts the locking surface 126 when the door 22 is closed. The outwardly curved profile of the locking surface 126 prevents movement of the cam follower locking arm 115 that the cam follower 108 will not pivot into the door open position once the latch lock mechanism 20 is placed in the closed position.

The drive link 110 is an adjustable-length rod that is pivotally connected at one end to the cam follower lifting arm 114 adjacent the cam follower bearing 118. The opposed end of the drive link 1 10 is connected to a bell crank 127 that is attached to the latch shaft 38 to move in unison with the latch shaft. In the depicted version of the invention, the locking mechanism 44 is arranged so that upward movement of the drive link 110 will result in counterclockwise movement of the latch shaft 38 and the crank arm 96.

Figure 6:
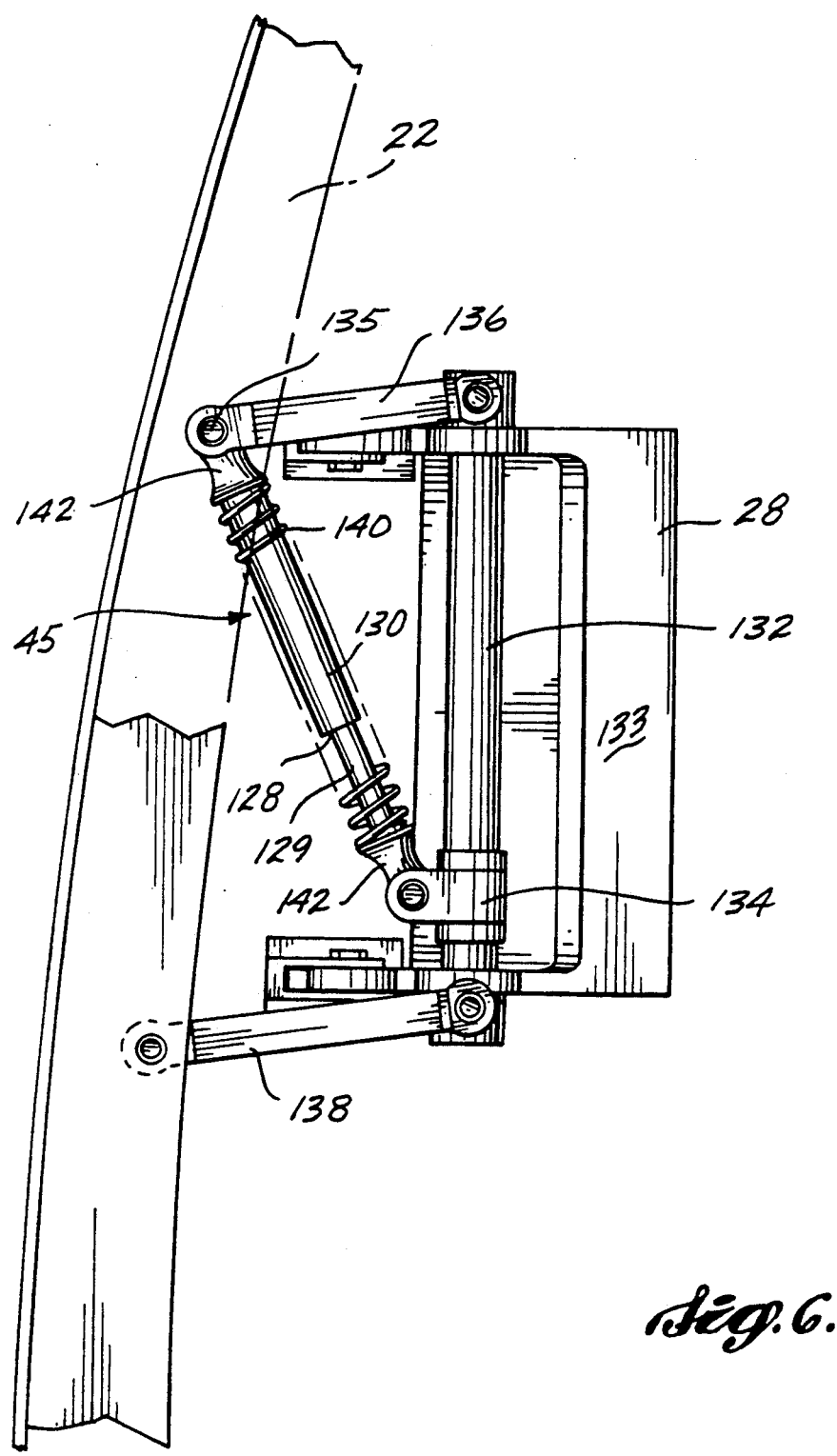
FIG. 6 is a side view of a counterbalance assembly of the latch lock mechanism of this invention.

FIG. 6 illustrates the counterbalance assembly 45 which includes a counterbalance guide 128 that is formed out of two sections coupled so that one section telescopes into the other. In the illustrated embodiment of the invention, the counterbalance guide 128 includes a small diameter lower section 129 which is connected at one end to a universal shaft 132 that is a part of the hinge 28. The universal shaft 132 is coupled to a fitting 133 that forms the body of the hinge 28, and can rotate freely relative to the fitting. The counterbalance guide lower section 129 is coupled to the lower portion of the universal shaft 132 by way of a U-shaped mounting bracket 134. A second, upper, large diameter counterbalance section 130 is fitted over the free end of the first section 129 and is attached to door 22 adjacent to the upper end of the universal shaft 132. In a preferred embodiment of the invention, the top end of the counterbalance guide upper section 130 is attached to a horizontally extending pin 135, an end of which is partially shown, that secures an upper lift link 136 to the aircraft door 22. The upper lift link 136, and a substantially identical spaced-apart lower lift link 138, are pivotally attached to both the door 22 and the hinge fitting 133. The lift links 136 and 138 provide a pantograph connection between the door 22 and the hinge 28 that allows the door to move up and down relative to the hinge. The upper end of the counterbalance guide second section is provided with a fitting, not illustrated, designed to receive the pin 135.

The counterbalance assembly 45 further includes a coil spring 140, shown in cutaway, that is disposed over the counterbalance guide 128. The opposed ends of the counterbalance guide lower and upper sections 129 and 130 respectively, are provided with annular spring stops 142, that block expansion of the spring 140. The spring stops 142 may be integrally formed with the counterbalance guide sections 129 and 130 or separate components that are fitted in place. When closed, the door 22 is in the lowest position relative to the hinge 28. In this position, the counterbalance guide 128 is at its shortest length so as to maximize the compression of the spring 140. The opening of the door 22 allows the door to rise so that the spring 140 can expand.

Figure 7A:
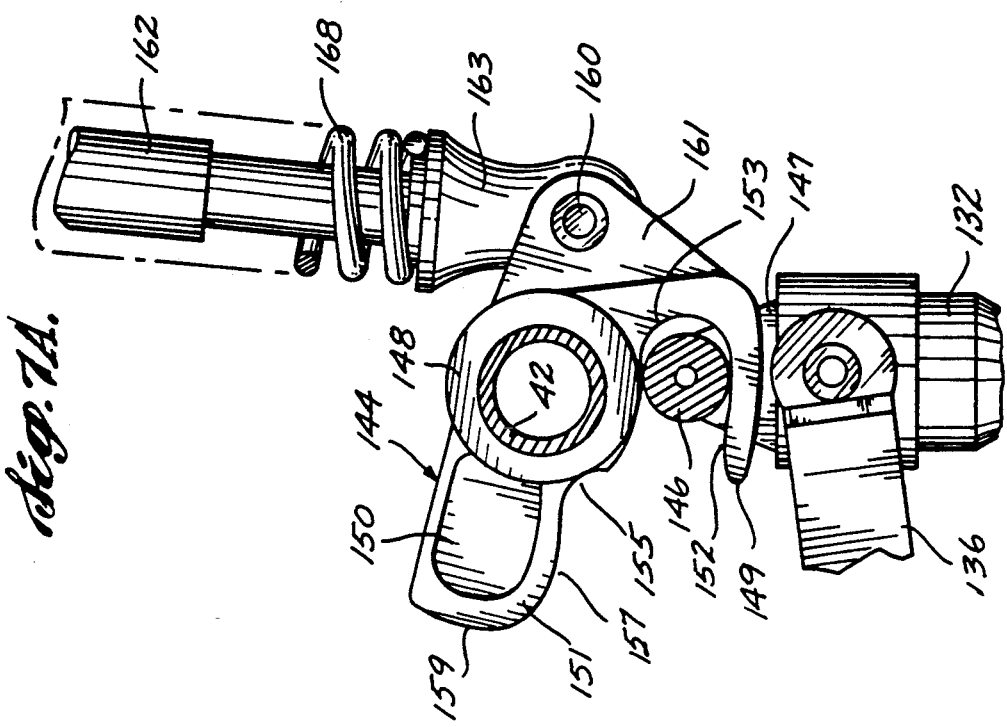
FIG. 7a is a detailed side view of the auxiliary latch hold-up cam of FIG. 7.
Figure 7:
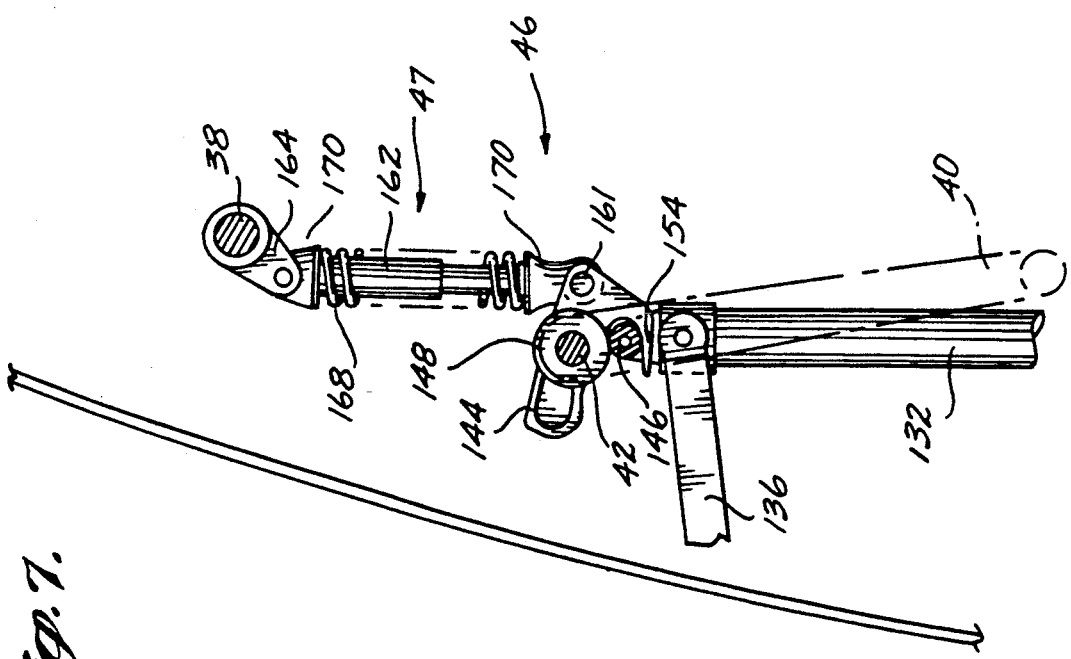
FIG. 7 is a side view of an auxiliary latch hold-up cam mechanism and a lock spring assembly of the latch lock mechanism of this invention when the latch lock mechanism is in the closed state.

The auxiliary latch-hold up cam mechanism 46, shown in detail in FIGS. 7 and 7a, serves to both hold the door 22 shut and allow the door to be opened in the event of malfunction of other components of the latch lock mechanism 20. The auxiliary latch-hold up cam mechanism 46 includes a single piece latch hook and hold up cam 144 that is mounted for rotation to the handle shaft 42. The latch hook and hold up cam 144 alternatively hooks and presses off against a cam follower bearing 146 rotatably attached to the top of the universal shaft 132. The auxiliary latching cam follower bearing 146 is a cylindrical bearing that is mounted for rotation to a pair of support clevises 147, one shown. The support clevises 147 are fixed to the universal shaft 132 to rotate with the shaft 132 so that the axis of the bearing 146 is always parallel to the axis of the latch shaft 38.

The auxiliary latch hook and hold up cam 144 has a tubular base section 148 that is secured to the handle shaft 42 to rotate in unison with the shaft. Integral with the base section 148 is an outboard-directed hook 149 and a web 150. The hook 149 is mounted to the inboard side of the base section 148; the web 150 is mounted to the outboard side. A flange 151 extends over the exposed edge of the web 150. The inside surface of the hook 149 adjacent the base section 148, the outer surface of the base section 148 and the cam flange 151 form a cam track surface over which the cam follower bearing 146 travels. To facilitate capture of the cam follower bearing 146 when the latch lock mechanism 20 is locked, the outer tip of the hook 149 is formed with an outwardly flared inner surface 152. The hook 149 is further shaped so that opposed inner surfaces have a fish mouth profile 153. In the event the door 22 is jolted upwards, the fish-mouthed profile 153 tends to drive the cam 144 into a more latched position, i.e., towards the cam follower bearing 146 which is securely fixed to the hinge 28.

The auxiliary latch hook and hold up cam 144 is shaped so that the flange 151 defines a detent 155 between the cam base section 148 and the web 150. The detent 155 has an inwardly directed profile relative to the overall general profile of the auxiliary latch hook and hold up cam 144. The web 150 and flange 151 are shaped so that the flange defines an auxiliary lifting surface 157 adjacent the detent 155. In the illustrated embodiment of the cam 144 is formed so that the auxiliary lifting surface 157 extends in a substantially linear path away from the detent 155. The overall shape of the auxiliary latch hook and hold up cam 144 is such that when the latch lock mechanism 20 is functioning properly, the detent 155 and the auxiliary lifting surface 157 do not contact the cam follower bearing 146.

The auxiliary latch hook and hold up cam 144 further defines a hold up surface 159. The hold up surface 159 is the outer surface of the cam flange 151 adjacent to the auxiliary lifting surface 157. In the depicted version of the invention, the auxiliary latch hook and hold up cam 144 is shaped so that the hold up surface 159 extends approximately perpendicular to the auxiliary lifting surface 157 and has an approximately constant radius relative the center of the cam base section 148.

The lock spring assembly 47 includes a two section, telescopically extending spring guide 162 that is pivotally connected to both the latch shaft 38 and the auxiliary latch hook and hold up cam 144. The spring guide 162 is connected to pair of clevises 161 that are attached to the auxiliary latch hat and hold up cam hook 149. A fastening pin 160 extends through the devises 161 and a fitting 163 attached to the end of the spring guide 162. The opposed end of the spring guide 162 is pivotally connected to a crank 164 that is attached for rotation to the latch shaft 38. The crank 164 is positioned so that as the latch shaft 38 is rotated from the door-open to the door-closed position, the crank arm is rotated over center from one side of the center line that extends between the axis of the latch shaft 38 and the handle shaft 42.

A lock spring 168, shown in cutaway, is disposed around the spring guide 162. The movement of the lock spring 168 is limited by a pair of annular spring stops 170 disposed over the opposed ends of the spring guide 162. The spring stops 170 may be integrally formed with the spring guide sections. Alternatively, the spring stops 170 may be separate components that are secured to the opposite ends of spring guide 162.

The pressure vent door (pvd) opener assembly 48, described with reference to FIGS. 8, 8a and 8b, in addition to serving as a pressure lock, functions as an interlock to prevent the inadvertent opening of the door 22 when the aircraft is in pressurized flight. The opening and closing of the pressure vent door 34 is controlled by rotation of the handle shaft 42. A pvd cam 174 is mounted to the handle shaft 42 to rotate in unison with the shaft. A pvd cam follower 176, which is pivotally mounted to the handle box 50, tracks the movement of the pvd cam 174. A pvd drive link 178 is connected between the pvd cam follower 176 and the pressure vent door 34 to open and close the door in response to the movement of the cam follower. The pvd opener assembly 48 further includes an ice breaker 180 that can pry the pressure vent door 34 open in the event the pressure vent door 34 is frozen shut with ice.

The pressure vent door 34 is normally seated in an opening 177 formed in the top of the aircraft door 22, as best seen in FIG. 8a. The pressure vent door 34 is secured to the door 22 by a pair of clevises 179 (FIG. 2) that are attached to the a beam 175 that forms part of the structural lattice of the aircraft door 22. A pair of stiffening ribs 181, that extend the height of the pressure vent door 34 (one rib shown in FIG. 8a) are pivotally attached to the clevises 179 such that each clevis-and-rib pair forms a hinge. Hinge pins 184, which extend through concentric openings formed in lower extensions of the stiffening ribs 181 and in the clevises 179, provide the mechanical connection therebetween. The securing of the pressure vent door 34 to the inside of the aircraft door 22 allows the pressure vent door 34 to open inwards and downwards relative to the aircraft door 22. The pressure vent door 34 is further provided with a lip 182 that extends around the main body of the door and is seated against the inside surface of the skin of the aircraft door 22. A seal 183 is secured to the lip 182 so as to provide an air-tight barrier between the pressure vent door 34 and the adjacent section of the aircraft door 22. The stiffening ribs 181 are formed with stop fingers 185 that extend above the pressure vent door lip 182. When the pressure vent door 34 is closed, the stiffening rib stop fingers 185 abut against rubber pads 187 that are secured to the inside surface of the outer skin of the aircraft door 22. The pressure vent door lip 182 and the stiffening rib stop fingers 185 prevent the outward movement of the pressure vent door 34.

In some preferred embodiments of the invention, torsion springs 186 (FIG. 2) are disposed about the pins 184, on spacers, not illustrated, fitted over the pins 184. The torsion springs 186 are connected at one end to the pressure vent door 34 and at the opposite end to the adjacent hinge clevis 179 so as to bias the pressure vent door open. The pvd opener assembly 48 normally biases the pressure vent door 34 closed. In the event of an unexpected failure of the pvd opener assembly 48, the torsion springs 186 open the pressure vent door 34 so as to insure that the aircraft cannot be pressurized.

The pvd cam follower 176 is formed out of an integral piece of metal that has a straight section 194 and a curved section 196 that together give the follower a general J-shape. The pvd cam follower 176 has a trunion 192 that is located at approximately the point where the straight section 194 and the curved section 196 are joined. The trunion 192 is pivotally mounted to the handle box 50. In the depicted embodiment of the invention, the pvd cam follower 176 is oriented generally upwards so that the straight follower section 194 is located adjacent the outer skin of the aircraft door 22.

The pvd cam follower 176 is provided with a rotatably attached pvd closing follower bearing 198 and a pvd opening follower bearing 199. The pvd closing follower bearing 198, is located adjacent the free end of the follower curved section 196. The pvd opening follower bearing 199, is located on the straight section 194 of the follower 176 at a point approximately in the middle of the section.

The pvd cam 174, as depicted in FIG. 8b, includes an annular base section 201 that is secured to the handle shaft 42 so as to rotate in unison with the shaft. A web 200 extends approximately 270° around the base section 201. A flange 202 on top of the web 200 forms a cam track surface over which the cam closing and opening follower bearings, 198 and 200 respectively, travel. The pvd cam 174 is shaped so that the flange 202 has a first dwell surface 203 and a second dwell surface 204. Both cam dwell surfaces 203 and 204 have a constant radius relative to the center of the base section 201. The first dwell surface 203 extends approximately 120° around the base section; the second dwell surface 204 extends approximately 100° around the center of the base section. The portion of the flange 202 between the first and second dwell surfaces, 203 and 204 respectively, defines a quick opening surface 205 that, in the illustrated embodiment of the invention, has a concave profile. A finger 206 extends outwards from the end the flange 202 that forms the section of the first dwell surface 203 that is distal from the quick opening surface 205. The surface of the finger 206 adjacent the first dwell surface 203 forms a quick closing surface 207. In the illustrated version of the invention, the quick closing surface 207 has wi inwardly curved profile. The pvd cam 174 is shaped so the curvatures of the quick opening surface 205 and the quick closing surface 207 are greater than the diameter of the cam follower bearings 198 and 199. The selective dimensioning of the surfaces 205 and 207 insures that the bearings 198 and 199 can freely travel over the pvd cam 174 when the cam is rotated. The pvd cam 174 is mounted to the handle shaft 42 so that when the aircraft door 22 is latched shut, the pvd cam follower closing bearing 198 is disposed against the tip of the pvd cam finger 206 and the follower opening bearing 199 is disposed against the first dwell surface 203 away from the opening surface 205.

A cylindrical spring guide 211 is connected between the pvd cam follower 176 and the drive link 178. The spring guide 211 is pivotally connected to the free end of the follower straight section 194. The spring guide is formed from two tubes 212 and 213 of unequal diameter that are configured so that tube 212 can telescope within tube 213. Tubes 212 and 213 are normally held apart by a negative vent spring 214, shown in cutaway, that is disposed about the guide 211 and that abuts against the opposed surface annular stop rings 215 that are attached to the individual tubes. In the event exterior pressure exceeds the fuselage interior pressure, the negative vent spring 214 in combination with the spring guide 211 will allow the outside pressure to force the pressure vent door open so that the two pressures can equalize. This movement will occur even if the latch lock mechanism 20 remains locked.

One end of the pvd drive link 178 is rigidly connected to the spring guide 211 so that the drive link and the spring guide share a single longitudinal axis. The opposed end of the pvd drive link 178 is connected to a pair of pvd drive levers 216 one shown that are pivotally attached to the aircraft door 22 as best seen in FIG.

8a. The drive levers 216 are pivotally attached to a pair of hinge clevises 218, one shown, that are fixed aircraft door beam 175. The pvd drive link 178 is pivotally secured in an opening, not illustrated formed approximately in middle of the pvd drive levers 216.

The ice breaker 180 is formed from a solid piece of metal and has an outward-directed face 221 that has a convex profile. The ice breaker 180 is pivotally coupled to a pair of lugs 222 that are integral with a pair of stiffening ribs 223 that extend the height of the pressure vent door 34. The lugs 222 extend above the top edge of the pressure vent door lip 182. The ice breaker 180 is pivotally secured to the lugs 222 by a pin 225 that extends through coaxial openings formed in the ice breaker and the lugs. The ice breaker 180 is mounted to the pressure vent door 34 so that the ice breaker face 221 is spaced slightly away and directed towards the inside surface of the outer skin of the aircraft door 22.

The ice breaker 180 is pivoted about the lugs 222 by a drive link 224 that is connected to the pvd drive levers 16. The drive link 224 is an adjustable length rod that is pivotally connected at one end to tabs 227, one shown, formed integrally with the pvd drive levers 216 and tabs 228, one shown, formed integrally with the ice breaker 180.

The pressure vent door 34 and the ice breaker 180 are arranged so that when the door 34 is initially opened, the ice breaker is pivoted upwards against the outer skin of the aircraft door 22 so as to create a prying force. In a preferred embodiment of the invention, the pressure vent door 34 is pried opened approximately 0.050 inches before the pvd drive link 178 starts to pivot the pressure vent door open. In the illustrated embodiment of the invention, this movement is arranged by connecting the pvd drive link 178 to the drive lever 216 at a point closer to the ice breaker drive link 224 connection than the clevis 218 connection.

FIG. 9 depicts in cross section how the lift-lock cam follower 108 and the pvd cam follower 176 are secured to the handle box 50. This Figure specifically depicts how the lift-lock cam follower 108 is secured to the handle box 50; the pvd cam follower 176 is mounted in a similar manner. The pvd cam follower trunion 112 is secured to a bolt 232 mounted to the adjacent handle box side bearing walls 52 and intermediate bearing web 66. In the illustrated embodiment of the invention, a single web 230 extends outwards from the center of the trunion 112. A flange 231 formed integrally with the web 230 is disposed on top of the web. The web 230 and flange 231 pair form the T-shaped cam lifting arm 114 to which the bearing 118 and drive link 110 are mounted in any conventional manner. A second web-and-flange pair, not shown, also extend outwards from the trunion 112 so as to form the locking arm 115. The pvd cam follower 176 (FIG. 8) is constructed so that a pair of spaced apart webs extend outwards from trunion 192; the webs are connected by a flange so as to form the straight and curved sections, 194 and 196, respectively, of the follower 176.

The bolt 232 extends through a pair of coaxial openings, not identified, formed in the handle box side bearing wall 52 and intermediate bearing web 66. A bushing 233 is fitting between the bolt 232 and the opening formed in the side bearing wall 52. A sleeve 235 is fitted over the bolt 232 and extends from the outer surface of the bushing 233, through the opening formed in the intermediate bearing web 66 and extends a slight distance beyond the intermediate bearing web. A bushing 229 is disposed between the sleeve 235 and the intermediate bearing web 66. A locknut 236 and washer 237 are secured over the free end of the bolt 232. The section of the sleeve 235 that extends beyond the side bearing wall 52 prevents from the locknut 236 and washer 237 from being tightened to the point where they compress the side bearing wall and intermediate bearing web 66 together which would inhibit the rotation of the lift-lock cam follower 108. The head 232a of the bolt 232 is formed with a D-shaped profile. When the bolt 232 is inserted in the handle box 50 the flat portion of the head 232a is fitted against a complementary tab 238 formed on the intermediate bearing web 66. The complementary profiles of the bolt head 232a and tab 238 serve to prevent the bolt from rotating once it is secured in place.

The lift lock cam follower trunion 112 is secured to the sleeve 235 by a pair of bearing assemblies 239. Each bearing assembly 239 has an inner race 240 that is fitted to the sleeve 235, an outer race 241 fitted to the trunion and a set of ball bearings 247 that provide a low friction interface therebetween. The trunion 112 is shaped to have an inner diameter that is greater than the outer diameter of the sleeve 235 so that the lift lock cam follower 108 can freely turn over the sleeve. In the illustrated embodiment of the invention, the trunion 112 has an inner diameter that is slightly greater than the outer diameter of the bearing assembly inner races 240. The bearing assembly outer races 241 are compression fitted in countersunk bores, not specifically identified, formed in the trunion 112. Also in the illustrated embodiment of the assembly, the bearing assembly outer races 240 are positioned so that there is a small space between each race and the side bearing wall 52 or intermediate bearing web 66 adjacent the race. A seal 245 is disposed over the exposed sides of betting races 240 and 241. The seal 245 prevents environmental contaminants from fouling the operation of the bearing assemblies 239.

The door assembly 22 and the fuselage 26 are respectively provided with guide roller bearings 258 and guide cam tracks 260 as depicted in FIG. 10 to insure that the door moves in the correct path when actuated by the latch lock mechanism 20. The guide cam tracks 260 are mounted to the fuselage frame members 103, one shown, that define the door opening 24 so the tracks extend into the opening. Each guide track 260 is in the form of an open-7 shape and is formed by a single flange 261 shaped to form an open horizontal section for receiving the guide roller bearings 258 and a closed vertical section. The flanges 261 are shaped so that the open ends of the tracks 260 are outwardly flared in order to facilitate the receiving of the guide roller bearings 258. In some preferred embodiments of the invention, the flanges 261 forming the guide cam tracks 260 may be formed integrally with base plates, not illustrated, similar to the cam track base plates 101 (FIG. 3) to facilitate mounting the flanges to the fuselage 26.

The guide roller bearings 258 are cylindrical bearings that are rotatably secured to mounting assemblies, not illustrated, that extend out from the aircraft door 22. The guide roller bearings 258 are positioned to be captured between the opposed sections of the flanges 261 forming the guide cam tracks 260. The guide roller bearings 258 minimize the friction associated with the roller bearing-guide cam track 260 interface. In most preferred embodiments of the invention the door assembly 22 and the fuselage 26 are provided with four guide roller bearing 268-guide cam track 260 pairs; one pair is located near each corner of the opposed door outer frame members.

When the door 22, with which the latch lock assembly 20 of this invention is used, is closed, the door is seated in the fuselage opening 24 so that the door stop pins 30 are located inside of and abut the fuselage stop pads 32. The guide roller bearings 258 are located in the closed ends of the associated guide cam tracks 260. The latch shaft 38 is in the closed position such that the cam follower bearings 98 are located above the latch shaft. The locking surface 126 of the lift lock cam 106 prevents the locking arm 115 of the cam follower from moving inwards (FIG. 5). This prevents the cam follower lifting arm 114 from moving upwards so the movement of the drive link 110 is similarly restricted. Since the drive link 110 is held in place, the latch shaft 38 is similarly locked and cannot rotate into the door open position.

The lock spring assembly 47 and the auxiliary latch-hold up cam mechanism 46 also prevent the door 22 from inadvertently opening (FIG. 7.) When the door 22 is closed, the lock spring guide 162 is positioned so that the lock spring 168 imposes a force on the spring guide crank 164 and the latch shaft 38 that urges the crank and the shaft into a more closed position. The auxiliary latch-hold up cam 144 is hooked over the cam bearing 146 when the door 22 is closed. In the event components of this invention such as the latch shaft 38 or the lift-lock cam assembly 106 fail, the auxiliary latch-hold up cam 144 will remain hooked around the cam bearing 118. Thus, the auxiliary latch-hold up cam 144 will hold the door 22 to the hinge 28 so as to prevent the door from opening even though the other locking elements of this invention may have malfunctioned.

In the event the door 22 is subjected to a jolting movement after the latch mechanism 20 has been locked, the latch mechanism 20 prevents the door from inadvertently opening. If the door 22 is moved upwards, as may happen if the aircraft is exposed to turbulence, the fish-mouth profile of the latch lock cam tracks 92 drive the latch shaft cam follower bearings 98 inwards so that latch shaft 38 is forced into a more latched position (FIG. 4). The fish-mouth profile of the latch hook-hold up cam hook 149 similarly causes the associated cam bearing 146 to drive the cam 144 into a more closed position. Consequently, unintentional upward movement of the door 22 does not result in the door stop pins 30 clearing the fuselage stop tabs 32 so as to allow the door to swing open. The door 22 remains closed. The lift-lock cam 106 and the pvd cam 174 are arranged on the handle shaft 42 so that when the handle shaft is rotated, the pressure vent door 34 is opened before the lift lock cam follower 108 starts to rotate the latch shaft. In the event the aircraft is in flight and the cabin is pressurized when the handle is actuated, the cabin pressure will hold the pressure vent door 34 closed. The pvd cam follower 176 will be prevented from opening beyond the opening surface 205 (FIG. 8). This inhibits, or stops, further rotation of both the pvd cam 174 and the handle shaft 42. The lock out of the handle shaft 42 prevents the lift lock cam 106 from rotating so as to prevent actuation of the latch shaft 38. Thus, the blocked opening of the pressure vent door 34 prevents the inadvertent actuation of the latch mechanism 20 when the aircraft is in flight.

The door 22 is opened by rotating the handle 40 upwards. The rotation of the handle 40 causes the simultaneous rotation of the handle shaft 42 so as to cause rotation of the lift lock cam 106, the auxiliary latch and hold-up cam 144 and the pvd cam 174. Initially, the lift lock cam follower lifting arm 114 passes over the adjacent cam dwell surface 120 and the pvd cam follower closing bearing 199 over the pvd cam quick opening surface 205 and onto the second 204 as depicted in FIG. 11. The movement of the pvd opening bearing 199 over the quick opening surface 205 forces the pvd cam follower 176 downwards so as to cause an identical movement in the pvd drive link 178. The ice breaker drive link 224 is in turn actuated so as to pivot the ice breaker 180. The movement of the ice breaker 180 causes the ice breaker face 221 to be pivoted towards the adjacent skin of the aircraft door 22. As a result, the ice breaker forces, pries, the pressure vent door 34 open an amount large enough to break any ice around the ice breaker door opening 177 but small enough that the barrier formed by the seal 183 is not broken. Once the pressure vent door 34 is initially pried open, the continued rotation of the handle 40 will cause the pvd drive link 178 to fully open the door 34.

Figure 14:
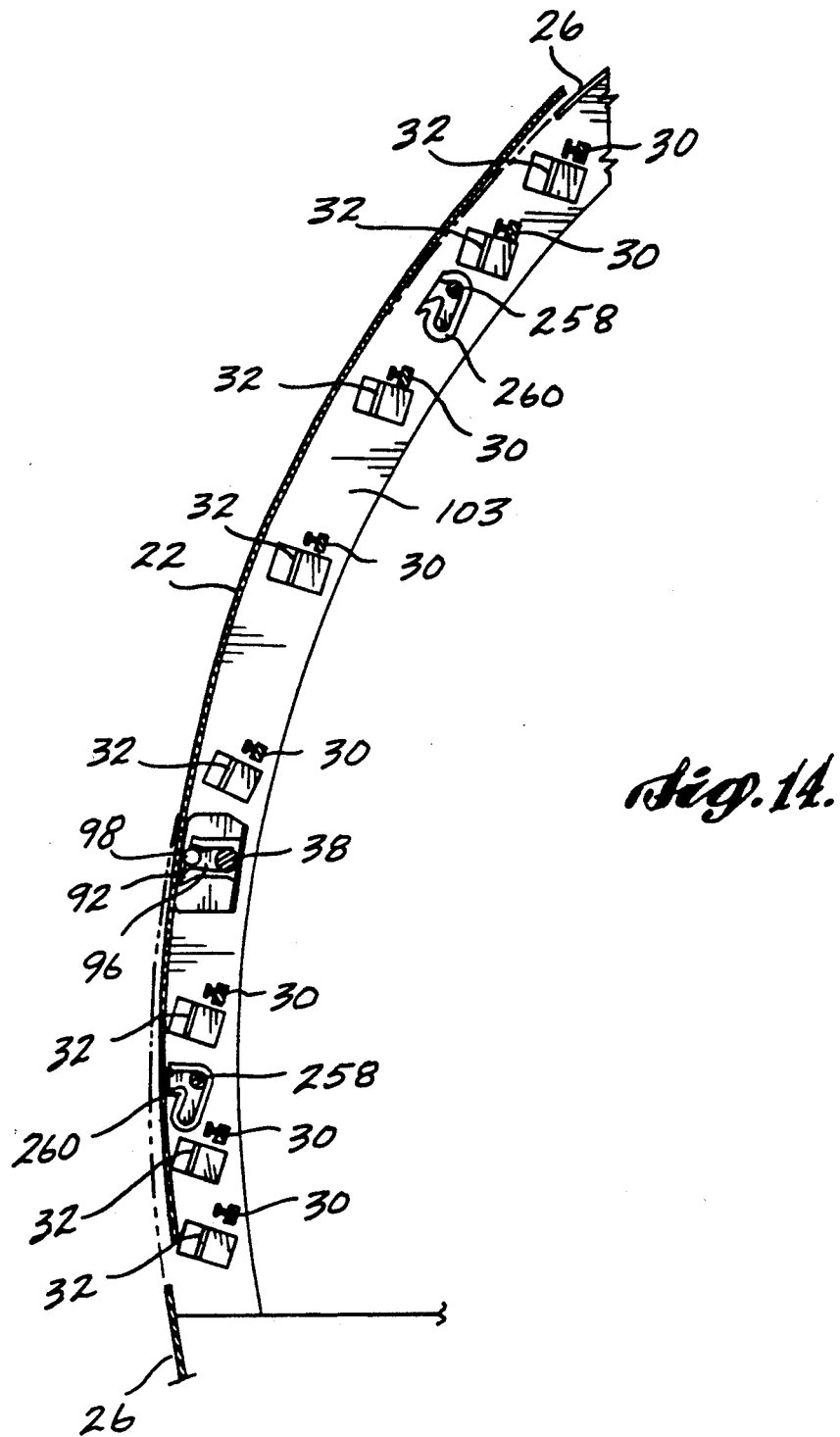
FIG. 14 is a side view of the fuselage frame member of FIG. 10 depicted the relative position of the components on the aircraft door and the fuselage when the door is in the open state.

Once the pressure vent door 34 is open, the handle shaft 42 is free to continue to rotate. The auxiliary latch and hold-up cam 144 is rotated free of the associated cam bearing 146 so as to unhook the door 22 from the hinge 28 as depicted in FIG. 12. As shown in FIG. 13, the lift-lock cam 106 is rotated so that the cam follower locking arm 115 is no longer blocked from movement by the cam locking surface 126 and the cam follower lifting arm bearing 118 is forced against the cam lifting surface. The cam follower lifting arm 114 is pivoted upwards so as to cause a similar upward movement in the latch drive fink 110. The movement of the latch drive link 110 causes the latch shaft 38 to be rotated counterclockwise. The rotation of the latch shaft 38 causes the cam follower bearings 98 to move in an arc centered around the axis of the latch shaft. Since the cam follower bearings 98 are horizontally locked into the cam tracks 92, the rotational movement of the bearings 98 about the latch shaft 38 results in the simultaneous upward movement of the latch shaft relative to the bearings as depicted in FIG. 14. The latch shaft 38 is firmly secured to the door 22 by the pillow blocks 76 and the handle box 50 (FIG. 2). As a result, the upward movement of the latch shaft 38 causes a coincidental movement of the door 22. As a result of the movement of the door 22 the door stop pins 30 rise above the fuselage stop pads 32. Since both the cam bearings 98 and the lift lock cam following lifting arm bearing 118 work against tangencies, the mechanical efficiency of the lifting motion theoretically approaches infinity. Thus an individual is able to move the door 22, which may weight 350 pounds or more, upwards with a simple arm motion.

The movement of the door 22 is kept on the proper path by the guide roller bearings 258, which travel in the guide cam tracks 260. In the illustrated embodiment of the invention, the figure-seven profile of the guide cam tracks 260 insure that the door 22 moves inwards and upwards. This movement serves to initially space the door stop pins 30 inwards, away from the fuselage stop pads 32, so that the movement of the door 22 will not be blocked by the fuselage stops.

Both the counterbalance assembly 45 and the lock spring assembly 47 provide auxiliary force to urge the door 22 upwards so that the door stops 30 clear the fuselage stops 32. Once the lift-lock cam 106 is rotated to the unlocked position, the counterbalance spring 140 (FIG. 5) is free to work against the door 22 so as to urge the door upwards. The rotation of the handle shaft 38 and the latch shaft 42, which are opposite each other, causes the spring guide 162 to reverse orientation relative to the latch shaft 38-handle shaft 42 center line (FIG. 12). Once this orientation is reversed, the lock spring 168 exerts a force on the latch shaft 38 so as to urge the shaft in the counterclockwise direction, the direction the shaft must be turned to open the door 22.

When the aircraft door 22 is initially lifted upwards, the door is initially suspended by the latch shaft cam bearings 98 which are suspended in the complementary cam follower tracks 92 (FIG. 14). The rotation of the handle shaft causes the lift-lock cam to be turned so that the hold open surface 122 is pressed against the lifting arm follower bearing 118. This prevents downward movement of the drive link 110 which, in turn, prevents reverse rotation of the latch shaft 38 which would result in the lowering of the door 22. During the final phase of the rotation of the handle 40, the auxiliary lift-hold up cam 144 is rotated so that the cam hold up surface 159 is forced against the cam bearing 146. Thus, when the aircraft door 22 is moved away from the door opening 24 and the cam bearings 98 are no longer locked in the cam tracks 92, the door will not fall because it is held in place by the action of the auxiliary latch-hold open cam 144 against the cam bearing 146.

Once the door 22 is in the up position, it can be pushed away from the door opening 24. The hinge 28 is configured so that as the door 22 is moved outwards from the opening 24, the door is simultaneously moved to the side so that it is laterally spaced from the opening. This frees a pathway through the door opening 24 so as to allow persons to enter and exit the aircraft. One such hinge 28 that is designed to cause this movement is disclosed in U.S. Pat. No. 4,720,065 to Hamatani for a Translatable Outward Opening Plug-Type Aircraft Door and Actuating Mechanisms Therefor which is owned by the assignee of this application is incorporated herein by reference.

In the event the latch shaft 38 or associated components fail, the auxiliary latch and hold-up cam mechanism 46 will open the door 22. When the door is normally opened, the upward movement of the handle box 50 relative to the hinge 28 results in the movement of the auxiliary latch and hold up cam 144 away from the cam bearing 146. The cam detent 155 and the cam auxiliary lifting surface 157 do not come into contact with the cam bearing 146 when the cam 144 is rotated between the open and closed positions. Only the cam hold up surface 159 actually comes in contact with the bearing 146. In the event the latch shaft 38 or other components fail, the handle box 50 will not move upwards in a normal movement. The rotation of the auxiliary latch and hold up cam 144 about the handle shaft 42 will eventually result in the auxiliary lifting surface 157 being urged against the cam bearing 146. The continued rotation of the cam 144 will result in the cam being forced upwards relative to the cam bearing 146 and the hinge 28. Since the auxiliary latch-hold up cam is secured to the aircraft door 22 by way of the handle 42 and the handle box 50, the upward movement of the cam 144 will result in the upward movement of the door. The upward movement of the door 22 will raise the door stop pins 30 above the fuselage stop pads 32 so that the door can then be opened in the usual manner.

If the latch shaft 38 or associated components fail, the auxiliary latch-hold up cam mechanism 46 prevents the door 22 from completely closing. Once the door 22 is moved into the opening, the handle shaft 42 is turned to lower the door in place. If the latch shaft or related components failed, the movement of the door 22 is controlled by the action of the auxiliary lift and hold up cam 144 against the cam bearing 146. The "lowering" rotation of the cam 144 will result in movement of the cam until the detent 155 is turned against the cam bearing 146. The continued rotation of the cam 144 will be blocked by the capture of the cam bearing 146 in the cam detent 155. The door 22 will not completely close. The partially closed state of the door 22 will thus serve as an indication to persons trying to close the door that there is a problem that requires attention.

The door 22 is normally closed by first moving the door into the fuselage opening 24 so that cam follower bearings 98 are seated in the cam tracks 92 and the guide roller bearings 258 are seated in the guide cam tracks 260. The handle 40 is then rotated downwards. Once the auxiliary latch and hold up cam hold open surface 159 is rotated off the cam bearing 146, and the lift link cam follower lift arm 114 is free of the associated cam hold open surface 122, gravity forces the door 22 downwards. The movement of the door 22 is damped by the counterbalance spring 140 which is compressed by the downward movement of the door. The continued rotation of the handle shaft results in the rotation of the lift lock cam against the cam follower locking arm 115, the latching of the auxiliary latch and hold up cam 144 to the cam bearing 146 and the shifting of the lock spring assembly 47 to the locked position.

During the last movement of the handle shaft 42 the aircraft door is shut. During this stage of the rotation of the handle shaft 42, the pvd cam 174 is rotated so that the quick closing surface 207 is forced against the closing follower bearing 198. This movement pivots the pvd cam follower 174 upwards so as to force the pvd drive link 178 upwards which results in the closing of the pressure vent door 34. The closing of the pressure vent door 34 thus serves as a visual indication latched and locked.

The latch-lock mechanism 20 of this invention opens the door 22 in response to the continual application of an upward force on the handle 40. A person opening the door does not have to apply a downward force, contrary to the desired upward motion of the door 22, in order to open the door. This serves to minimize the amount of physical strength and agility required to open the door. Moreover, when the door 22 is being opened, the counterbalance assembly 45 and the lock spring assembly 47 exert biasing forces to move the door upwards. The forces exerted by these assemblies 45 and 47 serve to further minimize the force an individual needs to apply to the door 22 in order to lift the door open.

The auxiliary latch shaft-hold up cam mechanism 46 opens the door 22 in the event of a latch shaft 38 failure and further prevents the door from being closed subsequent to the post-failure opening. Still another advantage of the latch lock mechanism 20 of this invention is that it is formed out of a minimum number of parts. Moreover, the components forming the mechanism 20 are relatively lightweight; there are only two shafts, which tend to be the heaviest components of these mechanisms. Thus, the latch lock mechanism 20 of this invention does not appreciably add to the overall weight of the aircraft to which it is attached. Another advantage of this lift-latch mechanism is that the majority of the components forming the mechanism are contained entirely within the handle box 50. This minimizes the difficulty of maintaining the mechanism and facilitates ready placement of the mechanism in the event extensive maintenance or repairs are required.

The foregoing description is for the purposes of illustration only. It will be appreciated that the attainment of some or all of the advantages thereof can be accomplished without departing from the scope of the claims. For example, the exact profiles of the lift-lock cam, the auxiliary latch-hold up cam and the pvd cam may vary significantly from what has been described. The disclosed construction of the pressure vent door 34 and associated opener assembly is similarly not meant to be limiting. In other embodiments of the invention, it may be desirable to provide a set of small vent s in the aircraft door each of which is normally covered by a complementary slats. Moreover, the depiction of the positioning of the latch shaft 38 above the handle shaft 42 should not be considered limiting. In alternative embodiments of the invention it may be desirable to configure the latch lock mechanism so that the handle shaft 42 is located above the latch shaft 38. Also, in other versions of this invention, the cam followers may not necessarily travel over the outer surfaces of the cams with which they are associated. For example, a cam can be constructed so that it has an interior groove in which the follower is disposed; the rotation of the cam would cause the cam follower, and any linkage member connected thereto, to move. This type of cam assembly could be used to construct a lift lock cam that has only a single cam follower. The groove in the cam would be shaped so that it would normally "lock out" movement of the cam follower and the drive link; when the cam was rotated, the movement would force the cam follower and drive link to rotate the latch shaft into the open position.

Furthermore, the latch lock mechanism of this invention can be constructed so that the lifting surface and the locking surface are on separate lifting and locking cams. In these versions of the invention it may desirable to provide a separate lifting cam follower with associated drive link and a separate locking cam follower with a locking link. Altenatively, a single lift-lock cam follower can be provided with arms that are positioned to abut the appropriate surfaces on the respective cams. In still other embodiments of the invention, the latch mechanism may be designed so that the auxiliary latch is designed to hook into another stable component other than the bearing mounted to hinge universal shaft.

Therefore, it is the object of the appended claims to cover all such variations and modifications that come within the true spirit and scope of the invention.

The embodiments of the invention in which an exclusive property or privilege is claimed are defined as follows:

1. A lift-latch mechanism for an aircraft door for selectively opening, closing, and locking the door in a door opening formed in an aircraft fuselage, said mechanism comprising:

an opposed set of cam tracks mounted to the fuselage on either side of the door opening;

a latch shaft assembly including an elongated latch shaft having an axis, said latch shaft extending approximately the width of the door opening and having a pair of opposed ends, at least one mounting member for rotatably securing said latch shaft to the aircraft door and a pair of crank assemblies secured to said opposed ends of said latch shaft to rotate in unison with said latch shaft, wherein each said crank assembly is provided with a cam bearing positioned to be disposed in an adjacent said cam track and said cam bearings having common axes and are axially offset from said latch shaft axis, whereby when said latch shaft is rotated about said latch shaft axis in an opening direction, said latch shaft pivots about said cam tracks so that said latch shaft and the door are moved upwards relative to said cam tracks;

a handle including a handle shaft, wherein said handle shaft is rotatably attached to the aircraft door along an axis approximately parallel with said latch shaft axis and said handle and said handle shaft can be rotated in a first, opening, direction and in a second, closing, direction opposite said opening direction;

a lifting cam attached to said handle shaft so as to rotate in unison therewith, wherein said lift cam is formed with a lifting surface;

a latch shaft lifting assembly including a lifting cam follower having a member positioned to be disposed against and displaced by said lifting cam lifting surface when said handle shaft is rotated in said handle shaft opening direction, and a drive link connected between said lifting cam follower and said latch shaft for rotating said latch shaft in said latch shaft opening direction when said lifting cam follower member is displaced by said lifting cam lifting surface;

a locking cam attached to said handle shaft to rotate in unison therewith, wherein said locking cam is formed with a locking surface; and a latch shaft locking assembly including a locking cam follower having a member positioned to abut said locking cam locking surface when said handle shaft is rotated in said closing direction, and a locking link connected between said locking cam follower and said latch shaft is prevent said latch shaft opening direction rotation when said locking cam follower member is disposed against said locking cam locking surface.

2. The latch lock mechanism of claim 1, wherein:

said lifting cam follower and said locking cam follower are a single lift lock cam follower wherein said lift lock cam follower has a lifting arm positioned to abut said lifting cam lifting surface and a locking arm positioned to abut said locking cam locking surface; and said drive link and said locking link comprise single drive link connected between said lift lock cam follower and said latch shaft.

3. The latch lock mechanism of claim 1, further including a lock spring assembly comprising a multi-section telescoping spring guide pivotally connected at a first end to said handle shaft and pivotally connected at a second end to said latch shaft, and a spring connected to said spring guide for urging said spring guide sections apart, wherein said spring guide is connected to said handle shaft and said latch shaft so that when the door is closed, said spring guide opposes said latch shaft opening direction and when said handle shaft is rotated to open the door, said spring guide imposes a force on said latch shaft to rotate said latch shaft opening direction.

4. The latch lock mechanism of claim 1, wherein the aircraft door is attached to the aircraft fuselage by a hinge, and wherein said latch lock mechanism further includes:

a bearing element on said hinge and an auxiliary cam attached to said handle shaft to rotate in unison therewith, wherein said auxiliary cam is formed with a hook positioned to capture said bearing element when said handle shaft is rotated in said closing direction.

5. The latch lock mechanism of claim 4, wherein said auxiliary cam is formed with an auxiliary lifting surface positioned to abut said bearing when said latch shaft fails and said handle shaft is rotated in said opening direction so that said auxiliary cam is urged upwards against said bearing so that the door is moved upwards relative to said cam tracks.

6. The latch lock mechanism of claim 5, wherein said auxiliary cam is further formed with a detent positioned to capture said bearing when said latch shaft fails and said handle shaft is rotated in said closing direction so that said bearing prevents continued closing rotation of said handle shaft.

7. The latch lock assembly to claim 1, wherein said lift cam and said latch shaft opening assembly are configured so that the aircraft door is opened by rotating said handle shaft upwards.

8. The latch lock mechanism of claim 1, wherein said lifting cam and said locking cam are a single lift lock cam and said lifting surface and said locking surface are different surfaces on said lift lock cam.

9. The latch lock mechanism of claim 8, wherein said latch lock cam is formed with a dwell surface adjacent said lifting surface such that said lifting cam follower member is positioned adjacent to said dwell surface when the door is closed, and said dwell surface is shaped so that when said handle shaft is initially rotated in said opening direction, said lift lock cam does not induce movement of said drive link, and said latch lock mechanism further includes a means for blocking rotation of said lift lock cam beyond said dwell surface when in flight.

10. The latch lock mechanism of claim 8, wherein:
said lifting cam follower and said locking cam follower are a single lift lock cam follower wherein said lift lock cam follower has a lifting arm positioned to abut said lift lock cam lifting surface and a locking arm positioned to abut said lift lock cam locking surface; and
said drive link and said locking link comprise a single drive link connected between said lift lock cam follower and said latch shaft.

11. The latch lock mechanism of claim 10, further including a lock spring assembly comprising a multi-section telescoping spring guide pivotally connected at a first end to said handle shaft and pivotally connected at a second end to said latch shaft, and a spring connected to said spring guide for urging said spring guide sections apart, wherein said spring guide is connected to said handle shaft and said latch shaft so that when the door is closed, said spring guide opposes said latch shaft opening direction and when said handle shaft is rotated to open the door, said spring guide imposes a force on said on said latch shaft to rotate said latch shaft opening direction.

12. The latch lock mechanism of claim 10, wherein the door is attached to the aircraft fuselage by a hinge, and wherein said latch lock mechanism further includes:

a compression guide assembly including a multi-section telescoping spring guide connected between the aircraft door and said hinge so that said spring guide is fully expanded when the door is in a maximum raised position relative to said hinge, and a spring disposed over said spring guide and coupled thereto so as to urge said spring guide sections apart.

13. The latch lock assembly of claim 10, wherein said lift lock cam and said lift lock cam follower are configured so that the aircraft door is opened by rotating said handle shaft upwards.

14. The latch lock mechanism of claim 10, wherein said lift lock cam follower includes a trunion rotatably mounted to the aircraft door, said lifting arm and said locking arm are attached to said trunion and said drive link is attached to one of said arms.

15. The latch lock mechanism of claim 14, wherein said drive link is attached to said lifting arm.

16. The latch lock mechanism of claim 10, wherein said means for blocking rotation of said lift lock cam includes: a pressure vent door pivotally mounted to said aircraft door wherein said pressure vent door is arranged to open inwardly; a pressure vent door opener cam attached to said handle shaft to rotate in unison therewith; a pressure vent door opener cam follower, pivotally attached to the aircraft door and positioned to abut said pressure vent door opener cam; and, a pressure vent door link attached between said pressure vent door and said pressure vent door opener cam follower, wherein when said pressure vent door opener cam, said pressure vent door opener cam follower and said pressure vent door opener drive link cooperate so that when said handle shaft is rotated in said opening direction, said pressure vent door will be urged open, and if said pressure vent door fails to open, said pressure vent door opener and said pressure vent door opener cam follower block further rotation of said pressure vent door opener cam and said handle shaft.

17. The latch lock mechanism of claim 16, further including an ice breaker pivotally attached to said pressure vent door and mechanically linked to said pressure vent door opener and having a face positioned to abut against the aircraft door when said pressure vent door is opened.

18. The latch lock mechanism of claim 10, wherein the aircraft door is attached to the aircraft fuselage by a hinge and wherein said latch lock mechanism further includes:

a bearing element on said hinge and an auxiliary cam attached to said handle shaft to rotate in unison therewith wherein said auxiliary cam is formed with a hook positioned to capture said bearing element when said handle shaft is rotated in said closing direction.

19. The latch lock mechanism of claim 18, wherein said auxiliary cam is formed with an auxiliary lifting surface positioned to abut said bearing when said latch shaft fails, and said handle shaft is rotated in said opening direction so that said auxiliary cam is urged upwards against said bearing so that the door is moved upwards relative to said cam tracks.

20. The latch lock mechanism of claim 19, wherein said auxiliary cam is further formed with a detent positioned to capture said bearing when said latch shaft fails and said handle shaft is rotated in said closing direction so that said bearing prevents continued closing rotation of said handle shaft.

21. The latch lock mechanism of claim 10, wherein said latch lock cam is formed with a dwell surface adjacent said lifting surface such that said lift lock cam follower lifting arm is positioned adjacent to said dwell surface when the door is closed, and said dwell surface is shaped so that when said handle shaft is initially rotated in said opening direction, said lift lock cam does not induce movement of said drive link, and said latch lock mechanism further includes a means for blocking rotation of said lift lock cam beyond said dwell surface when in flight.

22. The latch lock mechanism of claim 21, further including a lock spring assembly comprising a multi-section telescoping spring guide pivotally connected at a first end to said handle shaft and pivotally connected at a second end to said latch shaft, and a spring connected to said spring guide for urging said spring guide sections apart, wherein said spring guide is connected to said handle shaft and said latch shaft so that when the door is closed, said spring guide opposes said latch shaft opening direction and when said handle shaft is rotated to open the door, said spring guide imposes a force on said latch shaft to rotate said latch shaft opening direction.

23. The latch lock mechanism of claim 22, wherein the aircraft door is attached to the aircraft fuselage by a hinge, and wherein said latch lock mechanism further includes:
a bearing element on said hinge and an auxiliary cam attached to said handle shaft to rotate in unison therewith, wherein said cam is formed with an auxiliary lifting surface positioned to abut said bearing when said latch shaft fails, and said handle shaft is rotated in said opening direction so that said auxiliary cam is urged upwards against said bearing so that the door is moved upwards relative to said cam tracks.

24. The latch lock mechanism of claim 22, wherein the door is attached to the aircraft fuselage by a hinge, and wherein said latch lock mechanism further includes:
a compression guide assembly including a multi-section telescoping spring guide connected between the aircraft door and said hinge so that said spring guide is fully expanded when the door is in a maximum raised position relative to said hinge, and a spring disposed over said spring guide and coupled thereto so as to urge said spring guide sections apart.

25. The latch lock mechanism of claim 22, wherein the aircraft door is attached to the aircraft fuselage by a hinge, and wherein said latch lock mechanism further includes:
a bearing element on said hinge and an auxiliary cam attached to said handle shaft to rotate in unison therewith, wherein said auxiliary cam is formed with a hook positioned to capture said bearing element when said handle shaft is rotated in said closing direction.

26. The latch lock mechanism of claim 25, wherein said means for blocking rotation of said lift lock cam includes: a pressure vent door pivotally mounted to said aircraft door wherein said pressure vent door is arranged to open inwardly; a pressure vent door opener cam attached to said handle shaft to rotate in unison therewith; a pressure vent door opener cam follower pivotally attached to the aircraft door and positioned to abut said pressure vent door opener cam; and, a pressure vent door drive link attached between said pressure vent door and said pressure vent door opener cam follower wherein when said pressure vent door opener cam, said pressure vent door opener cam follower and said pressure vent door opener drive link cooperate so that when said handle shaft is rotated in said opening direction said pressure vent door will be urged open, and if said pressure vent door fails to open, said pressure vent door opener and said pressure vent door opener cam follower block further rotation of said pressure vent door opener cam.

27. The latch lock mechanism of claim 26, further including an ice breaker pivotally attached to said pressure vent door and mechanically linked to said pressure vent door opener and having a face positioned to abut against the aircraft door when said pressure vent door is opened.

28. The latch lock assembly of claim 26, further including a handle box attached to the aircraft door wherein said latch shaft and said handle shaft are rotatably attached to said handle box, said lift lock cam follower and said pressure vent door cam follower are pivotally mounted to said handle box, and said lift lock cam, said auxiliary cam and said pressure vent door opener cam are at least partially disposed in said handle box.

29. The latch lock mechanism of claim 25, wherein said auxiliary cam is formed with an auxiliary lifting surface positioned to abut said bearing when said latch shaft fails, and said handle shaft is rotated in said opening direction so that said auxiliary cam is urged upwards against said bearing so that the door is moved upwards relative to said cam tracks.

30. The latch lock mechanism of claim 29, wherein said auxiliary cam is further formed with a detent positioned to capture said bearing when said latch shaft fails and said handle shaft is rotated in said closing direction so that said bearing prevents continued closing rotation of said handle shaft.

31. The latch lock mechanism of claim 29, further including a compression guide assembly including a multi-section telescoping spring guide connected between the aircraft door and said hinge so that said spring guide is fully expanded when the door is in a maximum raised position relative to said hinge, and a spring disposed over said spring guide and coupled thereto so as to urge said spring guide sections apart.

32. The latch lock assembly of claim 29, wherein said lift lock cam and said lift lock cam follower are configured so that the aircraft door is opened by rotating said handle shaft upwards.

33. A pressure vent door assembly for installation in a door opening formed in the outer structural element of an aircraft comprising:
a pressure vent door pivotally attached to the aircraft so as to normally be seated in the door opening wherein, said pressure vent door is attached to the aircraft to move inward away from said opening when said pressure vent door is opened;
a door drive linkage attached to said pressure vent door so as to pivot said pressure vent door open; and
an ice breaker attached to said drive linkage and said pressure vent door and having a face positioned adjacent an inside surface of the aircraft adjacent the door opening wherein said ice breaker is attached to said door drive linkage so that, when said door drive linkage is actuated to open said pressure vent door, said ice breaker face is urged against the aircraft inside surface so as to pry said pressure vent door away from the door opening.

34. The pressure vent door of claim 33, wherein said ice breaker face is spaced from the inside surface of the aircraft and said ice breaker is connected to said door drive linkage so that said ice breaker pries said pressure vent door away from the door opening prior to said door drive linkage pivoting said pressure vent door away from said door opening.

35. The pressure vent door assembly of claim 34, wherein:
said pressure vent door includes a lip that is disposed around the inside surface of the aircraft adjacent the door opening and seal attached to said lip so as to form a pressure-tight barrier between said pressure vent door and the aircraft outer structural element; and
said ice breaker face is spaced from the aircraft inside surface and said ice breaker is connected to said door drive linkage so that when ice breaker is actuated, said ice breaker pries said pressure vent door open a limited amount so that said pressure-tight barrier established by said seal is maintained.

36. The pressure vent door of claim 33, wherein:
said pressure vent door includes a lip that is disposed around the inside surface of the aircraft adjacent the door opening and seal attached to said lip so as to form a pressure-tight barrier between said pressure vent door and the aircraft outer structural element; and
said ice breaker face is spaced from the aircraft inside surface and said ice breaker is connected to said door drive linkage so that when ice breaker is actuated, said ice breaker pries said pressure vent door open a limited amount so that said pressure-tight barrier established by said seal is maintained.

37. The pressure vent door assembly of claim 33, wherein said door drive linkage is attached to a drive lever which is pivotally attached to the aircraft and said ice breaker is pivotally attached to said pressure vent door and, further including an ice breaker door drive linkage connected between said ice breaker and said door drive linkage, and wherein said door drive linkage and said ice breaker drive link are attached to said driver lever so that when said door drive linkage is actuated to open said pressure vent door, said ice breaker drive link is actuated to pivot said ice breaker.

38. The pressure vent door of claim 37, wherein:
said pressure vent door includes a lip that is disposed around the inside surface of the aircraft adjacent the door opening and seal attached to said lip so as to form a pressure-tight barrier between said pressure vent door and the aircraft outer structural element; and
said door drive linkage, said drive lever, said ice breaker drive link and said ice breaker are arranged so that said ice breaker pries said pressure vent door open a limited amount so that said pressure-tight barrier established by said seal is maintained.

39. The pressure vent door of claim 37, wherein said door drive linkage, said drive lever, said ice breaker drive link and said ice breaker are arranged so that said ice breaker pries said pressure vent door away from the door prior to said door drive linkage pivoting said pressure vent door away from said opening.

40. The pressure vent door assembly of claim 39, wherein:
said pressure vent door includes a lip that is disposed around the inside surface of the aircraft adjacent the door opening and seal attached to said lip so as to form a pressure-tight barrier between said pressure vent door and the aircraft outer structural element; and
said door drive linkage, said drive lever, said ice breaker drive link and said ice breaker are arranged so that when ice breaker is actuated, said ice breaker pries said pressure vent door open a limited amount so that said pressure-tight barrier established by said seal is maintained.

* * * * *

UNITED STATES PATENT AND TRADEMARK OFFICE
CERTIFICATE OF CORRECTION

PATENT NO. : 5,305,969
DATED : April 26, 1994
INVENTOR(S) : Odell et al.

It is certified that error appears in the above-indentified patent and that said Letters Patent is hereby corrected as shown below:

On the title page, item:

| | | |
|---|---|---|
| [57] "Abstract" | 8 & 9 | "link-age (1 10)" should read --linkage (110)-- |
| Column | Line | |
| 20 (Claim 2, | 53 Line 8) | after "comprise" insert --a-- |
| 21 (Claim 11, | 65 Line 12) | after "said" delete "on said" |
| 22 (Claim 16, | 31 Line 10) | after "door" insert --drive-- |

Signed and Sealed this

Ninth Day of August, 1994

Attest:

BRUCE LEHMAN

Attesting Officer

Commissioner of Patents and Trademarks